US009342877B2

(12) United States Patent
Coon

(10) Patent No.: US 9,342,877 B2
(45) Date of Patent: May 17, 2016

(54) SCALING A THREE DIMENSIONAL MODEL USING A REFLECTION OF A MOBILE DEVICE

(71) Applicant: GLASSES.COM INC., Mason, OH (US)

(72) Inventor: Jonathan Coon, Austin, TX (US)

(73) Assignee: Glasses.com Inc., Mason, OH (US)

(*) Notice: Subject to any disclaimer, the term of this patent is extended or adjusted under 35 U.S.C. 154(b) by 461 days.

(21) Appl. No.: 13/973,836

(22) Filed: Aug. 22, 2013

(65) Prior Publication Data

US 2015/0054917 A1 Feb. 26, 2015

(51) Int. Cl.
*H04N 13/02* (2006.01)
*H04N 17/00* (2006.01)
*G06T 7/00* (2006.01)
(Continued)

(52) U.S. Cl.
CPC . *G06T 7/00* (2013.01); *G06F 21/31* (2013.01); *G06F 21/36* (2013.01); *G06K 9/00228* (2013.01); *G06T 7/60* (2013.01); *G06T 19/20* (2013.01); *G06T 2207/30201* (2013.01); *G06T 2207/30204* (2013.01); *G06T 2210/16* (2013.01); *G06T 2219/2016* (2013.01); *H04N 13/0253* (2013.01); *H04N 13/0278* (2013.01)

(58) Field of Classification Search
CPC .......... H04N 13/0203; H04N 13/0253; H04N 13/0278; H04N 5/2628; H04N 17/00; H04N 17/002; H04N 13/02; G06T 7/00; G06T 7/60; G06T 2210/16; G06T 2207/30201; G06T 2207/30204; G06T 19/20; G06F 21/31; G06F 21/36; G06K 9/00228

USPC .......... 348/46, 42, 49, 51, 54, 180, 187, 188; 345/419, 629, 630, 634, 635, 653, 660, 345/664

See application file for complete search history.

(56) References Cited

U.S. PATENT DOCUMENTS 8,705,812 B2 * 4/2014 Karakotsios ....... G06K 9/00255
345/419
2008/0151092 A1 6/2008 Vilcovsky
2008/0163344 A1 7/2008 Yang
(Continued)

FOREIGN PATENT DOCUMENTS

WO 2011019965 A1 2/2011

OTHER PUBLICATIONS

PCT International Search Report for corresponding PCT International Patent Application No. PCT/US2014/052116, mailed Dec. 1, 2014.

*Primary Examiner* — Sherrie Hsia
(74) *Attorney, Agent, or Firm* — Holland & Hart LLP

(57) ABSTRACT

A computer-implemented method for scaling a three dimensional model of an object is described. In one embodiment, first and second calibration images may be shown on a display of a mobile device. The display of the mobile device may be positioned relative to a mirrored surface. A reflection of an object positioned relative to the mobile device may be captured via a camera on the mobile device. A reflection of the first and second calibration images may be captured. The captured reflection of the object and the captured reflection of the first and second calibration images may be shown on the display. A reflection of the displayed captured reflection of the first and second calibration images may be captured. When the captured reflection of the displayed captured reflection of the first calibration image is positioned relative to the captured reflection of the second calibration image may be detected.

20 Claims, 17 Drawing Sheets

(51) Int. Cl.
*G06F 21/31* (2013.01)
*G06T 19/20* (2011.01)
*G06K 9/00* (2006.01)
*G06T 7/60* (2006.01)
*G06F 21/36* (2013.01)

(56) References Cited

U.S. PATENT DOCUMENTS

2009/0116766 A1 5/2009 Matsumoto et al.
2013/0141468 A1 6/2013 Coon

* cited by examiner

SCALING A THREE DIMENSIONAL MODEL USING A REFLECTION OF A MOBILE DEVICE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers.

Computers have opened up an Industry of internet shopping. In many ways, online shopping has changed the way consumers purchase products. For example, a consumer may want to know what they will look like wearing or holding a product. However, online shopping has disconnected customers from the ability to try things out before buying. Online product pages often show a photograph of a model with or wearing a particular product, but users may desire a more accurate depiction of themselves in relation to various products.

SUMMARY

According to at least one embodiment, a method of determining a target dimension on an object is described. In one embodiment, first and second calibration images may be shown on a display of a mobile device. The display of the mobile device may be positioned relative to a mirrored surface. A reflection of an object positioned relative to the mobile device may be captured via a camera on the mobile device. A reflection of the first and second calibration images may be captured via the camera on the mobile device. The captured reflection of the object and the captured reflection of the first and second calibration images may be shown on the display. A reflection of the displayed captured reflection of the first and second calibration images may be captured via the camera on the mobile device. When the captured reflection of the displayed captured reflection of the first calibration image is positioned relative to the captured reflection of the second calibration image may be detected via the camera on the mobile device.

In some embodiments, an image of the object may be scaled based on the detection of the relative positioning of the captured reflections of the first and second calibration images. A 3-D model of the object may be generated and scaled based on the scaling of the image of the object. An image of the object may be captured in relation to the detection of the relative positioning of the captured reflections of the first and second calibration images.

In one embodiment, a target dimension of the object may be determined from the captured image of the object. The target dimension may be a distance between two points on the object. The object may be a human face and the display may be positioned relative to the human face. At least one facial feature of the face may be detected. The facial feature spatially may be related to the target dimension. A detected aspect of the image may be related to a predetermined reference dimension in relation to the detection of the relative positioning of the captured reflections of the first and second calibration images. The first calibration image may include a machine-readable identification code.

A computing device configured to determine a target dimension on an object is also described. The device may include a processor and memory in electronic communication with the processor. The memory may store instructions that are executable by the processor to display first and second calibration images on a display of a mobile device, the display of the mobile device being positioned relative to a mirrored surface, capture, via a camera on the mobile device, a reflection of an object positioned relative to the mobile device, and capture, via the camera, a reflection of the first and second calibration images. The instructions may be executable by a processor to display the captured reflection of the object and the captured reflection of the first and second calibration images on the display, capture a reflection of the displayed captured reflection of the first and second calibration images, and detect when the captured reflection of the displayed captured reflection of the first calibration image is positioned relative to the captured reflection of the second calibration image.

A computer-program product to determine a target dimension on an object is also described. The computer-program product may include a non-transitory computer-readable medium that stores instructions. The instructions may be executable by a processor to display first and second calibration images on a display of a mobile device, the display of the mobile device being positioned relative to a mirrored surface, capture, via a camera on the mobile device, a reflection of an object positioned relative to the mobile device, and capture, via the camera, a reflection of the first and second calibration images. The instructions may be executable by a processor to display the captured reflection of the object and the captured reflection of the first and second calibration images on the display, capture a reflection of the displayed captured reflection of the first and second calibration images, and detect when the captured reflection of the displayed captured reflection of the first calibration image is positioned relative to the captured reflection of the second calibration image.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
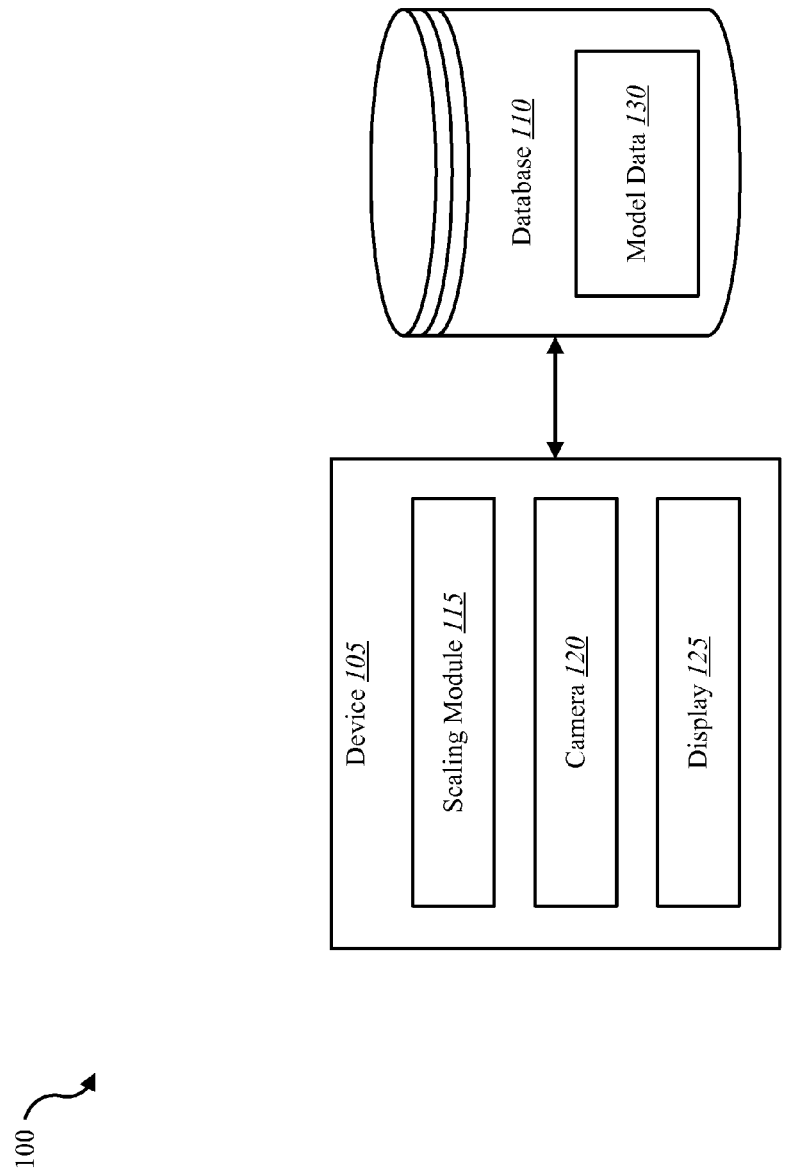
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Online shopping may be especially unpopular in the eyewear industry. This may be due to the unique look of eyewear on each person's face. Some eyewear providers have websites that allow users to upload photos of themselves so that images of eyewear may be overlaid on their photos, but there are many drawbacks hindering user adoption of this shopping experience. One of these is the user's inability to see the eyewear from multiple angles. Also, the scale of the photo may not match the scale of the eyewear image on the website, causing scaled composite images of the user and the eyewear that may be misleading.

Some stores allow users to input measurements of their faces, but taking important measurements such as the pupillary distance between the eyes is difficult and unreliable without equipment from an optometrist and a trained practitioner taking the measurements. Currently, disappointing results may occur due to issues with properly scaling depictions of users when virtually trying on or appearing with products before purchase. The emergence and increasing popularity of mobile computing devices having high-resolution cameras and large displays provides opportunities to address many of these drawbacks.

By using three-dimensional (3-D) models of a user or object, a user may perceive himself (or herself) more accurately, and by scaling an object such as eyewear to the user's facial features, a much more accurate depiction of the product can be given to the user. Mobile devices such as tablet computers allow a shopper to take their measurements, in some cases, using nothing more than his device and a common mirror. These measurements can then be used to scale a 3-D model of the user's face and produce an accurate depiction of the user's appearance as if the user were physically wearing the clothing or eyewear.

The systems and methods described herein relate to the virtual try-on of products. Three-dimensional (3-D) computer graphics may be graphics that use a 3-D representation of geometric data that may be stored in the computer for the purposes of performing calculations and rendering two-dimensional (2-D) images. Such images may be stored for viewing later or displayed in real-time. A 3-D space may include a mathematical representation of a 3-D surface of an object. A 3-D model may be included within a graphical data file. A 3-D model may represent a 3-D object using a collection of points in 3-D space, connected by various geometric entities such as triangles, lines, curved surfaces, etc. Being a collection of data (points and other information), 3-D models may be created by hand, algorithmically (procedural modeling), or scanned, such as with a laser scanner. A 3-D model may be displayed visually as a two-dimensional image through a process called 3-D rendering, or used in non-graphical computer simulations and calculations. In some cases, the 3-D model may be physically created using a 3-D printing device.

A device may capture an image of the user and generate a 3-D model of the user from the image. A 3-D polygon mesh of an object may be placed in relation to the 3-D model of the user to create a 3-D virtual depiction of the user wearing the object (e.g., a pair of glasses, a hat, a shirt, a belt, etc.). This 3-D scene may then be rendered into a 2-D image to provide the user a virtual depiction of the user in relation to the object. Although some of the examples used herein describe articles of clothing, specifically a virtual try-on pair of glasses, it may be understood that the systems and methods described herein may be used to virtually try-on a wide variety of products. Examples of such products may include glasses, clothing, footwear, jewelry, accessories, hair styles, etc.

In the process of capturing an image and generating 3-D models of the user and the object being worn, the object may be virtually scaled to better display the fit of the object on the user and to more accurately render the appearance of the user's model wearing the object in virtual space. In the process of scaling a model, a reference image may be captured. The reference image may be used to identify a feature of the user to compare to a reference dimension in the image. By making the comparison to a reference dimension, measurements corresponding with the feature of the user may be at least approximately determined in a manner not heretofore known.

Having determined the measurements of features of the user, the 3-D model may be more accurate in generating a realistic model of the object, e.g., clothing, when it is placed on a model of the user. A more accurate rendering of the object on the user leads to a better user experience when, for example, the 3-D model may be used to virtually try on an article of clothing. The properly-scaled virtual model gives the user a better preview of what the object will look like on the user without having to physically try it on. This can be advantageous in situations where the user may be shopping for an item without the item being immediately available, such as, for example, shopping via the Internet. While the appearance of an item may be communicated via images on the Internet, the fit of an item on a user's unique face and head may be represented when the object is matched to the user's unique proportions in the displayed view of the object, particularly when shown with the user's head as part of the rendered scene.

Mirrored surfaces may be used in capturing and generating 3-D models of the user and the object being worn. Mirrored surfaces may include common mirrors, including planar mirrors providing a 1:1 reflected representation of incident light. Mirrored surfaces may also include multiple elements, such as, for example, a virtual mirror comprising an electronic display showing the output of a camera pointing toward a subject in front of the display. In some embodiments, a virtual mirror may include a mobile device (an iPad, for example) with a screen and front-facing camera.

A virtual mirror may therefore simulate a common mirror in its function by showing a reproduction of what is in front of the display. A virtual mirror may also provide additional features, including, for example, scaling at a non-1:1 ratio or horizontal or vertical reversal of the subject. In some embodiments, the virtual mirror replicates a common mirror as closely as possible. When scaling an image using a mirrored surface having a ratio other than 1:1, a conversion ratio may be used to ensure that measurements taken in a captured image are properly scaled to correspond with accurate proportions of the head of the subject.

Mobile devices may be used in the measurement and scaling of a 3-D object. A mobile device may be a mobile computing device, such as a handheld computing tablet, smartphone, notebook or laptop computer, and related devices. A mobile device may typically include a camera and a display, but may include additional components. A camera of a mobile device may be located on the device to create a virtual mirror in relation to the display. Thus, the camera's output may be shown on the display of the mobile device with the camera being pointed at a subject in front of the display. In some arrangements, the camera may be integral to a bezel or other housing of the display, and in some other arrangements, the camera may be separate from the display, such as, for example, a webcam attached to the display or positioned near the display. The camera may be in electronic communication with the display so as to provide its output through the display.

A mobile device may include additional computing elements, such as, for example, a processor and associated memory that are part of a tablet computer. In some arrangements the mobile device may be merely an output of a distinct computing device, such as, for example, a monitor of a desktop computer. In yet further arrangements, a mobile device has computing elements and the display and camera may be in communication with a distinct computer, such as a desktop computer, where the distinct computer processes the input of the camera of the mobile device and sends the result to be output on the display of the mobile device. In some arrangements the distinct computer may be accessed wirelessly by the mobile device or through a connection to a network, such as a local area network (LAN) or wide area network (WAN).

A display (of, e.g., a mobile device) may be an electronic display, such as a liquid crystal display (LCD) or plasma screen or monitor. A display of a mobile device may be capable of rendering images generated by a computer, preferably in real-time, in order to provide an approximate appearance of a mirror to the user.

FIG. 1 is a block diagram illustrating one embodiment of an environment 100 in which the present systems and methods may be implemented. In some embodiments, the systems and methods described herein may be performed on a single device (e.g., device 105). For example, the systems and methods described herein may be performed by a scaling module 115 that may be located on the device 105. Examples of the device 105 include mobile devices, smart phones, personal computing devices, PDAs, computers, servers, etc.

In some configurations, a device 105 may include the scaling module 115, a camera 120, and a display 125. In one example, the device 105 may be coupled to a database 110. The database 110 may be internal to the device 105. In another embodiment, the database 110 may be external to the device 105. In some configurations, the database 110 may include model data 130. Model data 130 may comprise data structures used in the rendering and display of 3-D models, such as computer modeled eyewear data or computer-simulated human facial feature data.

In one embodiment, the scaling module 115 may scale a 3-D model of an object. In one example, scaling a 3-D model of an object enables a user to view an image on the display 125 that may be based on the scaled, 3-D model of the object. For instance, the image may depict a user virtually trying-on a pair of glasses with both the user and the glasses being scaled according to a common scaling standard.

In some configurations, the device 105 may be provided at a mirrored surface along with an object having a measurable target dimension. For instance, a mobile computing device may be provided at a mirror along with the user's face. The target dimension may be defined as a distance between two points on the object, such as the distance between two facial features when the object is a face. In some arrangements, the target dimension may be the pupillary distance on a face, as used in optometry to define the distance between the subject's pupils. Determining the pupillary distance of a face may allow a more accurate rendering of glasses that fit the size of the user's face by scaling a model of glasses to match the user's pupillary distance.

At the mirrored surface, the display 125 may be configured to show an output of the camera 120. With the display 125 facing the mirrored surface and the camera 120 viewing the mirrored surface as well, the camera 120 may be positioned to view the reflection of the display and a reflection of the target dimension of the object.

When properly positioned, the scaling module 115 may show a depiction of a first and second calibration image on the display 125 where the camera's output of a reflected first calibration image (which is, for example, a machine-readable identification code image) and the second calibration image (e.g., a bracket image) are aligned. For example, the reflection of the first calibration image as seen by the camera may be positioned to fit within a bracket shape of the second calibration image. An exemplary construction showing the positioning of the device 105 at a mirrored surface is described in further detail in connection with FIGS. 7-9.

To ensure proper alignment, the scaling module 115 may complete a process by which the alignment of the first and second calibration images may be confirmed by reading a machine-readable identification code (e.g., a quick response (QR) code) of the first calibration image while it is shown inside the bracket of the second calibration image. In some arrangements, the machine-readable identification code may be generated after the type of mobile device is detected. For example, a user may input the type of device or type of display on the mobile device, and a QR code may be generated having predetermined on-screen dimensions based on the size or resolution of the display of the mobile device. In other configurations, software of the device may recognize the reflection of the device (e.g., its dimensions or identifying colors) and retrieve or generate a QR code corresponding to the device identified. In one example, the user may access a website that determined the type of device (based on browser session information, for example) and provides a device-specific QR code that identifies the device so that a known size for the device may be determined. In some cases, the displayed QR code may be specifically formatted for the display (e.g., screen and/or pixel configuration) of the mobile device so that the QR code is displayed at a known size. In this scenario, the QR code may itself (additionally or alternatively) be a reference dimension used in accordance with the systems and methods described herein. By using a QR code as the first calibration image, it may be easier to determine that the device is properly positioned, since a unique QR code would not be found in the background of a scene and would not be mistakenly identified in the features of a face or other item seen by the camera.

In some embodiments, the display may also be positioned adjacent to a facial feature (e.g., chin). This may help ensure that the camera has a view of both a reference dimension on the device and a target dimension of a face.

The scaling module 115 may determine the target dimension of the object by comparing the target dimension as seen by the camera to a reference dimension on the mobile device (e.g., the width of the first calibration image) as seen by the camera. In some arrangements, the comparison of the reference dimension and the target dimension may be facilitated by obtaining a reference image containing both dimensions as seen by the camera and comparing the target dimension to the reference dimension within the reference image. For example, for a reference dimension having a known length, the distance between the endpoints of the reference dimension in the reference image may be directly compared to the distance between the endpoints of the target dimension of the object, and the target dimension may be proportionally calculated using these measurements in the reference image.

When necessary, a pattern recognition module may be accessed as part of the scaling module 115 to detect the endpoints of the target dimension within the view of the camera. In some arrangements, the pattern recognition module detects head-related patterns such as, for example, facial features (e.g., eyes, nose, ears), or head shape or orientation. In some embodiments, the pattern recognition module finds non-facial features such as, for example, dots on a page, letters, reference points (e.g., the horizon), corners, or shapes (e.g., the shape of the device 105).

With the target dimension determined, the scaling module 115 may access the model data 130 of the database 110 to produce a scaled 3-D representation of the model which matches the scale of the object in relation to the target dimension. For instance, the model may be eyeglasses which may be scaled to fit a user's face in relation to the face's pupillary distance. In some embodiments, the model data 130 may include one or more definitions of color (e.g., pixel information) for the 3-D model of the object (e.g., user). In one example, the 3-D model of the object may have an arbitrary size. In some embodiments, the scaled 3-D model of the object (as scaled by the systems and methods described herein, for example) may be stored in the model data 130. In some cases, the model data 130 may include the image of the user holding the mobile device.

In some configurations, an image based on the scaled 3D model of an object may be displayed via the display 125. For example, an image of a virtual try-on based on the scaled 3D representation of a user and a 3D model of glasses scaled according to a common scaling standard may be displayed to the user via the display 125.

Figure 2:
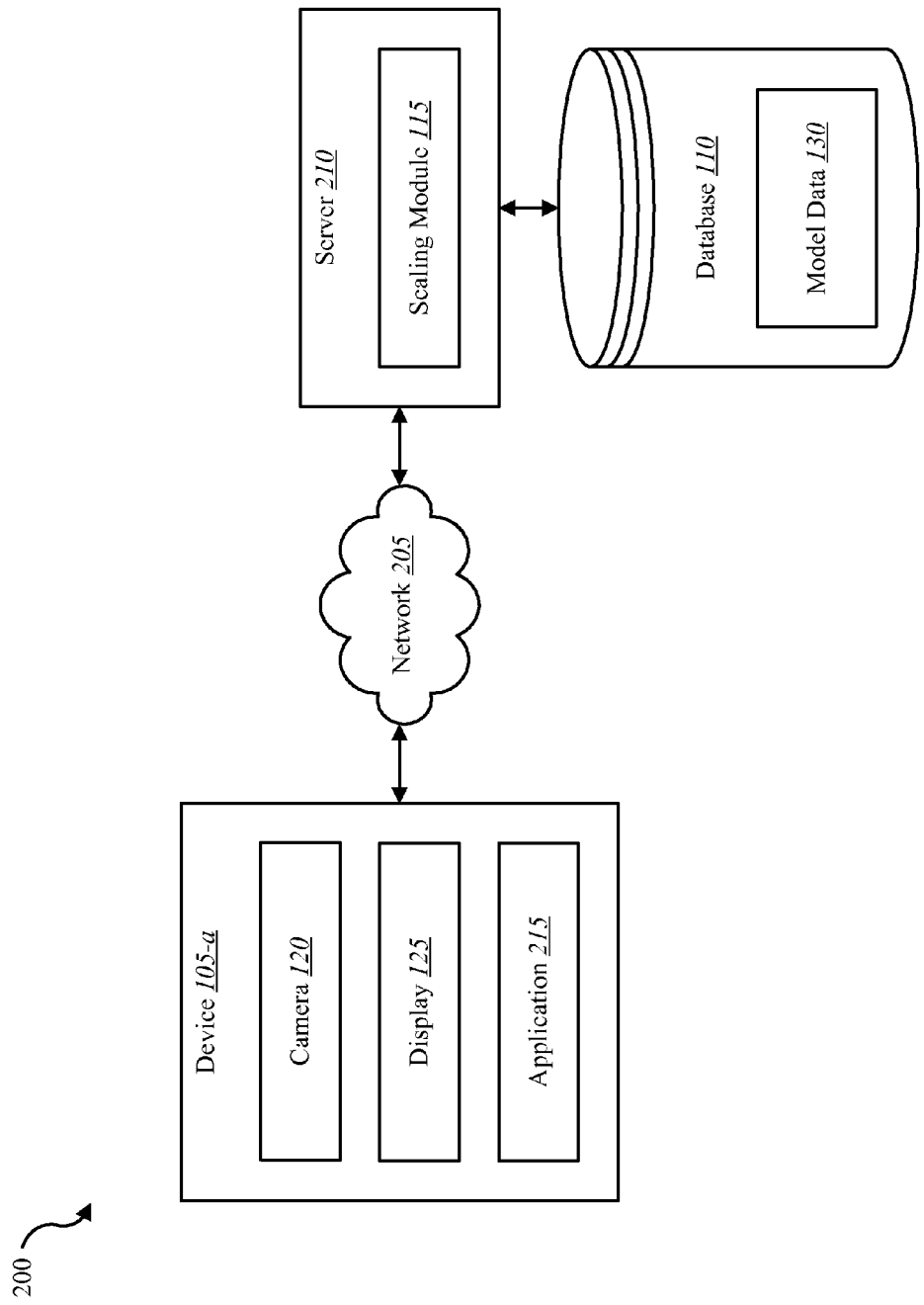
FIG. 2 is a block diagram illustrating another embodiment of an environment in which the present systems and methods may be implemented.

FIG. 2 is a block diagram illustrating another embodiment of an environment 200 in which the present systems and methods may be implemented. In some embodiments, a device 105-a may communicate with a server 210 via a network 205. Examples of networks 205 include local area networks (LAN), wide area networks (WAN), virtual private networks (VPN), cellular networks (using 3G and/or LTE, for example), etc. In some configurations, the network 205 may be the internet. In some configurations, the device 105-a may be one example of the device 105 illustrated in FIG. 1. For example, the device 105-a may include the camera 120, the display 125, and an application 215. It is noted that in some embodiments, the device 105-a may not include a scaling module 115.

In some embodiments, the server 210 may include the scaling module 115. In one embodiment, the server 210 may be coupled to the database 110. For example, the scaling module 115 may access the model data 130 in the database 110 via the server 210. The database 110 may be internal or external to the server 210.

In some configurations, the application 215 may capture one or more images via the camera 120. For example, the application 215 may use the camera 120 to capture an image of an object having a target dimension and a reference dimension. In one example, upon capturing the image, the application 215 may transmit the captured image to the server 210.

In some configurations, the scaling module 115 at the server 210 may operate as described above and as will be described in further detail below. In one example, the scaling module 115 may transmit scaling information and/or information based on the scaled 3-D model of the object to the device 105-a, such as, for example, pattern recognition results and related data. In some configurations, the application 215 may obtain the scaling information and/or information based on the scaled 3-D model of the object and may output an image based on the scaled 3-D model of the object to be displayed via the display 125.

Figure 3:
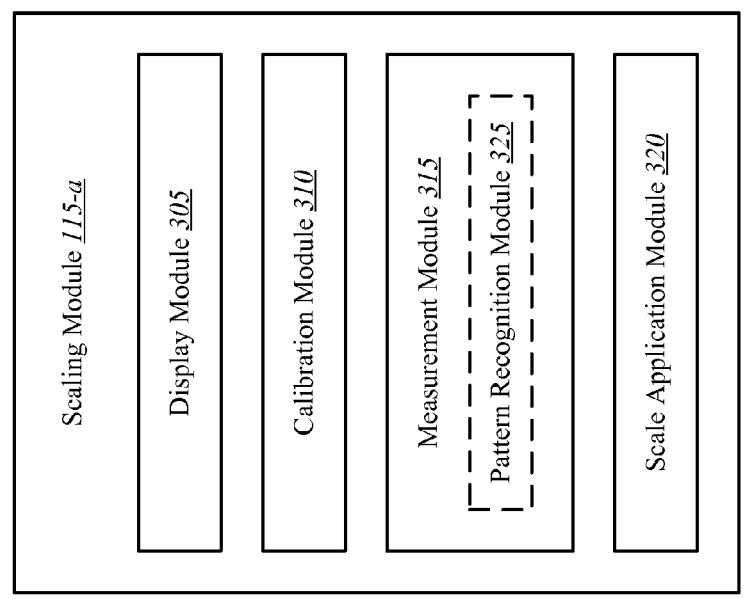
FIG. 3 is a block diagram illustrating one example of a scaling module.

FIG. 3 is a block diagram 300 illustrating one example of a scaling module 115-a. The scaling module 115-a may be one example of the scaling module 115 illustrated in FIG. 1 or 2. In some configurations, the scaling module 115-a may obtain an image (depicting an object and a reference dimension, for example) and a 3-D model of the object. In one example, the image may depict only a portion of the object and only a portion of the reference dimension. As noted previously, the reference dimension may have a known size. As will be described in further detail below, the scaling module 115-a may scale the 3-D model of the object based on the known size of the reference dimension. In some configurations, the scaling module 115-a may include a display module 305, a calibration module 310, a measurement module 315, and a scale application module 320. A measurement module 315 may also comprise a pattern recognition module 325 in some cases.

A display module 305 may provide logic for the generation and output of graphics and images to a display (e.g., display 125), including images such as the first and second calibration images. The display module 305 may scale the on-screen dimensions of one or more of the calibration images to adjust the desired alignment position of the device in front of a mirror, as described in further detail in connection with FIGS. 6 through 9 below.

A calibration module 310 may provide logic for the detection of the alignment of the calibration images as seen by the camera when the mobile device is properly positioned in front of a mirrored surface. The calibration module 310 may also analyze the images received by the camera in order to detect whether the target dimension is in view prior to capturing an image or making a comparison of a reference dimension on the device to the target dimension.

A measurement module 315 may provide logic for the measurement of the target dimension in comparison to the reference dimension. Thus, the measurement module 315 may include instructions for conducting such a comparison, including, for example, detecting endpoints of the target dimension and the reference dimension. In some embodiments, the measurement module 315 may include a pattern recognition module 325 enabled to detect patterns that allow the scaling module 115-a to determine the areas or points seen by the camera that are detected and measured when these areas or points are a part of patterns (e.g., features on a face). A measurement module 315 may also provide the ability to calculate the comparison of the target dimension to the reference dimension and thus produce the final measurement needed for scaling a 3-D model to match the object's scale.

A scale application module 320 may obtain the measurement information produced by the measurement module 315 and, in some embodiments, the pattern recognition module 325, to produce the scaled 3-D model using the determined target dimension. For example, the scale application module 320 may obtain a measurement of the distance between the pupils of the user after comparison of that distance to a reference dimension (e.g., the width of the first calibration image), and determine that a 3-D model of a pair of glasses should be scaled to an appropriate size to match a model scaled to approximate the user's head. Thus, when the model of the glasses is placed with the model of the user's head, a more accurate representation may be generated of how the glasses would appear to the user if he or she were to physically try them on.

Figure 4:
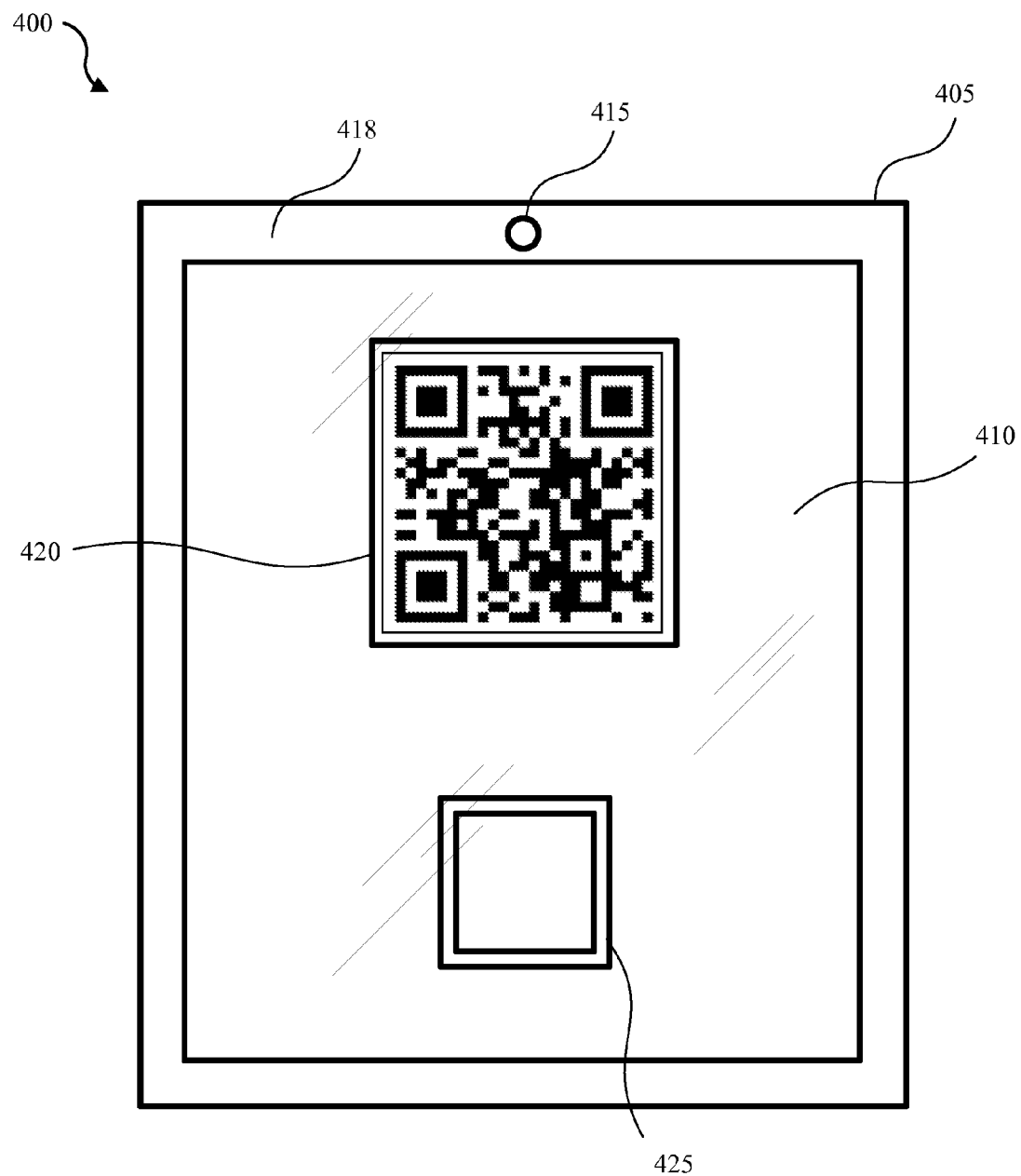
FIG. 4 illustrates an example of a mobile device.

FIG. 4 is a diagram 400 of a front view of a mobile device 405. The mobile device 405 may be the same device 105 as described in FIGS. 1 and 2. The mobile device 405 (e.g., tablet computer) has a display 410 on which images may be shown. The mobile device 405 also has a camera 415, which is shown near the top edge of the device 405. In some arrangements, the output of the camera 415 may be shown on the display 410. The camera 415 may be positioned in a central portion of a bezel 418 of the device 405 as shown. For example, the camera 415 may be integrally formed with a top central portion of the device 405. A centrally-positioned camera allows the display 410 to better act as a virtual mirror when the output of the camera 415 is displayed centrally on the display 410. In other embodiments, the camera 415 may be positioned off-center on the device 405 or may be external to the device (e.g., a webcam or camera attachment) as described above.

The display 410 may show at least a first calibration image 420 and a second calibration image 425. The display 410 may also sequentially or simultaneously show the output of the camera 415. In some embodiments, the output of the camera 415 may be displayed behind the calibration images 420, 425 (see, e.g., FIGS. 5 and 11-14). In some of these configurations, the calibration images 420, 425 may be at least partially transparent in the display 410, allowing at least part of the output of the camera 415 to be seen through the calibration images 420, 425 displayed. For example, the second calibration image 425 may be partially transparent throughout the entire image, or it may be completely transparent at portions of the image, such as if it were a bracket or frame allowing the output of the camera 415 appear to be "behind" the display of the image 425. When the calibration images 420, 425 are at least partially transparent, the user may find it easier to orient the camera 415 and thus align the calibration images 420, 425.

The first calibration image 420 may be displayed above the second calibration image 425 on the display 410. The first calibration image 420 may be a machine-readable identification code, for example, a quick response (QR) code or a barcode. Alternatively, the first calibration image 420 may be another image that may be recognizable by a calibration module 310 and measurement module 315. In some embodiments the first calibration image 420 preferably has high contrast, allowing the calibration and measurement modules 310, 315 to more easily identify and verify the alignment of the first calibration image 420 with the second calibration image 425 when the output of the camera is simultaneously shown on the display 410.

In some instances, the object being measured by the device 405 may be disposed above the camera 415. Here, the first calibration image 420 may be preferably above the second calibration image 425 so that it may be positioned closer to the object and the camera 415. In other configurations, the first calibration image 420 may be displayed elsewhere on the display 410 to facilitate ease of obtaining a measurement using the device 405.

The first and second calibration images 420, 425 may not overlap on the display, at least in the portions of the images 420, 425 that are intended to align when the device 405 is positioned for obtaining a measurement of an object. The first and second calibration images 402, 425 may be positioned along a common line across the display 410, for example, along a common central vertical axis running across the front of the display. The diagram 400 shows the calibration images 420, 425 positioned vertically in-line with the camera 415 and the rest of the mobile device 405.

The second calibration image 425 may be a shape (e.g., a box or circle) or other image (e.g., a bracket, a series of dots, or a set of crosshairs). The second calibration image 425 may be a partially transparent version of the first calibration image 420. In some embodiments, the second calibration image 425 has smaller on-screen dimensions than the first calibration image 420 (see, e.g., FIG. 4). For example, the second calibration image 425 may be a scaled version of the first calibration image 420. The second calibration image 425 may have at least partial transparency, as described above, but opaque images or images with adjustable transparency may be part of other alternative embodiments.

Figure 5:
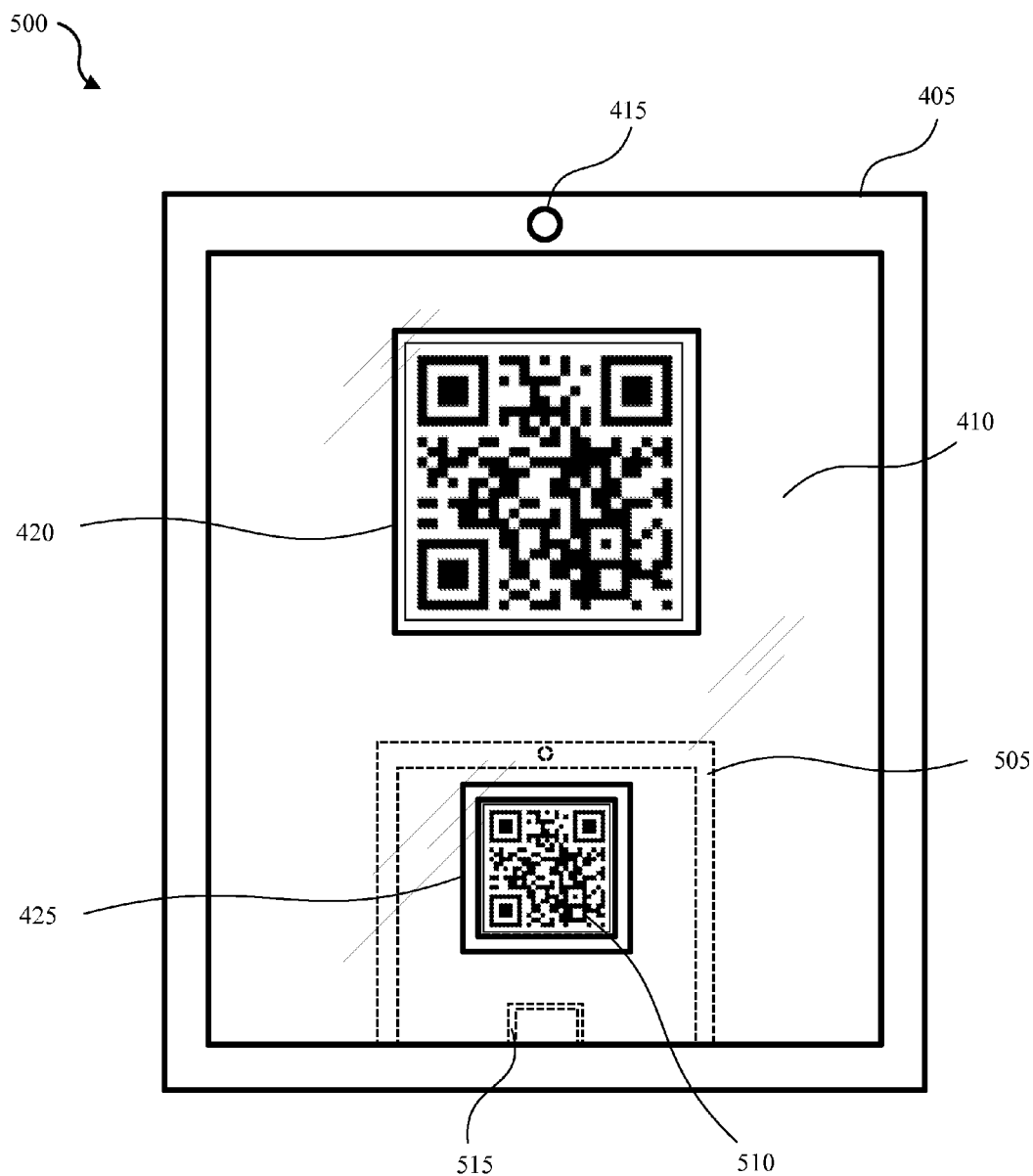
FIG. 5 illustrates an example of a mobile device showing the output of its camera when the camera faces a mirrored surface.

FIG. 5 is a diagram 500 illustrating one example of a device 405 showing the output of its camera 415 on its display 410 when the camera 415 may be facing a reflective, mirrored surface. The display 410 shows the reflected mobile device 505 having a reflected first calibration image 510 and a reflected second calibration image 515. The reflected mobile device 505 may be seen with the reflected first calibration image aligned with the second calibration image 425, which may not be a reflection. The output of the camera 415 may be seen on the display 410 simultaneously with the first and second calibration images 420, 425. Thus, the display 410 may present reflected and non-reflected versions of first calibration images 510, 420 and reflected and non-reflected versions of second calibration images 515, 425 simultaneously.

Notably, in these embodiments the reflected device 505 may not be a reflection directly created on the display 410 (e.g., by the surface of the display 410 being a polished surface). Instead, the reflected device 505 may be the camera's 415 view of the reflection of the device 405 in the mirrored surface, and that view may be shown on the display 410. If the user covered up the camera 415, the reflected device 505 may not be seen on the display according to these embodiments. However, other embodiments allow actual reflections on the display to be used in aligning a mobile device.

If the camera 415 changes direction, the reflected device 505 changes position on the display 410. Therefore, the reflected device 505 may not be seen on the display 410 if the camera 415 is not facing the reflection of the device 405. In order for the alignment of FIG. 5 to occur, the camera 415 may be angled to cause the reflected first calibration image 510 align with the second calibration image 425.

Figure 6:
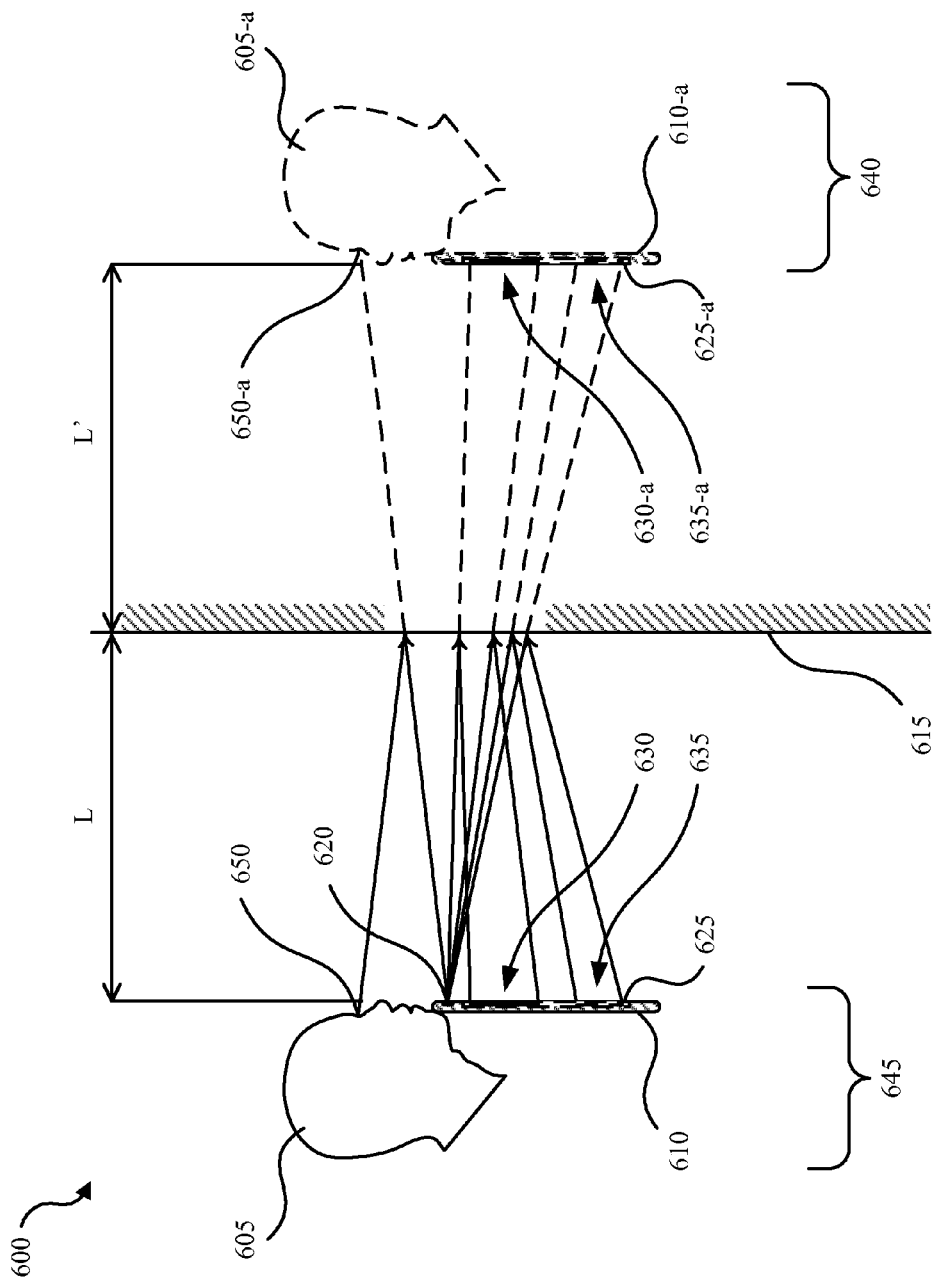
FIG. 6 is a diagram illustrating a right side view of how reflected images may be viewed by a camera of a mobile device.

FIG. 6 is a diagram 600 illustrating a right side view of an object 605 (e.g., head) having a target dimension 650 (e.g., pupillary distance) and a mobile device 610 positioned in front of a mirrored surface 615 at a distance L. A camera 620 and display 625 are part of the mobile device 610, and the display shows a first calibration image 630 above a second calibration image 635. For convenience, a reflection 640 of the original items 645 is shown as they appear to the camera ("behind" the mirrored surface 615 at distance L'). The reflected object 605-a and its target dimension 650-a is seen next to the reflected mobile device 610-a, which has a reflected display 625-a and corresponding reflected first and second calibration images 630-a, 635-a.

The target dimension 650 in this and other figures is approximately in-plane with the display 625. Being at least close to in-plane with the display may allow for simpler calculation of the target dimension 650 due to it appearing at approximately the same distance from the camera 620 as the calibration images 630, 635. In one example, the object 605 may be a face, and the mobile device 610 may be positioned adjacent to the face so that one or more facial features are at least approximately in-plane with the display 625.

In some embodiments, the target dimension 650 may be out of plane with the display 625, such as being closer to or farther from the mirrored surface 615 than the display 625. In these embodiments, the distance between the mirrored surface 615 and the target dimension 650 may need to be known independent from the distance L so that the target dimension 650 may be scaled appropriately (e.g., when it is measured using a reference image having a reference dimension on the device 610).

The construction lines between the device 610 and the mirrored surface 615 show the path of the light entering the camera 620. The dashed construction lines between the mirrored surface 615 and the reflection 640 are shown for convenience in understanding the relationship between the original items 645 and the reflection 640. Thus, a construction line running from the camera 620 to the reflected target dimension 650-a shows that the camera receives light incident from the original target dimension 650. The first calibration image 630 and reflected first calibration image 630-a have construction lines showing the path of light from the top and bottom edge of the first calibration image 630 to being seen by the camera 620. The second calibration image 635 and its reflection 635-a also has these top and bottom edge construction lines shown. In this embodiment, the first calibration image 630 is taller than the second calibration image 635.

The reflection 640 appears to the camera 620 to be at a distance equal to the sum of L and L'. When the mirrored surface 615 is a 1:1 common mirror, L is equal to L', but in other arrangements, such as which the mirrored surface is a virtual mirror, the reflection's distance behind the mirror L' will change according to the ratio of the mirrored surface.

Figure 7:
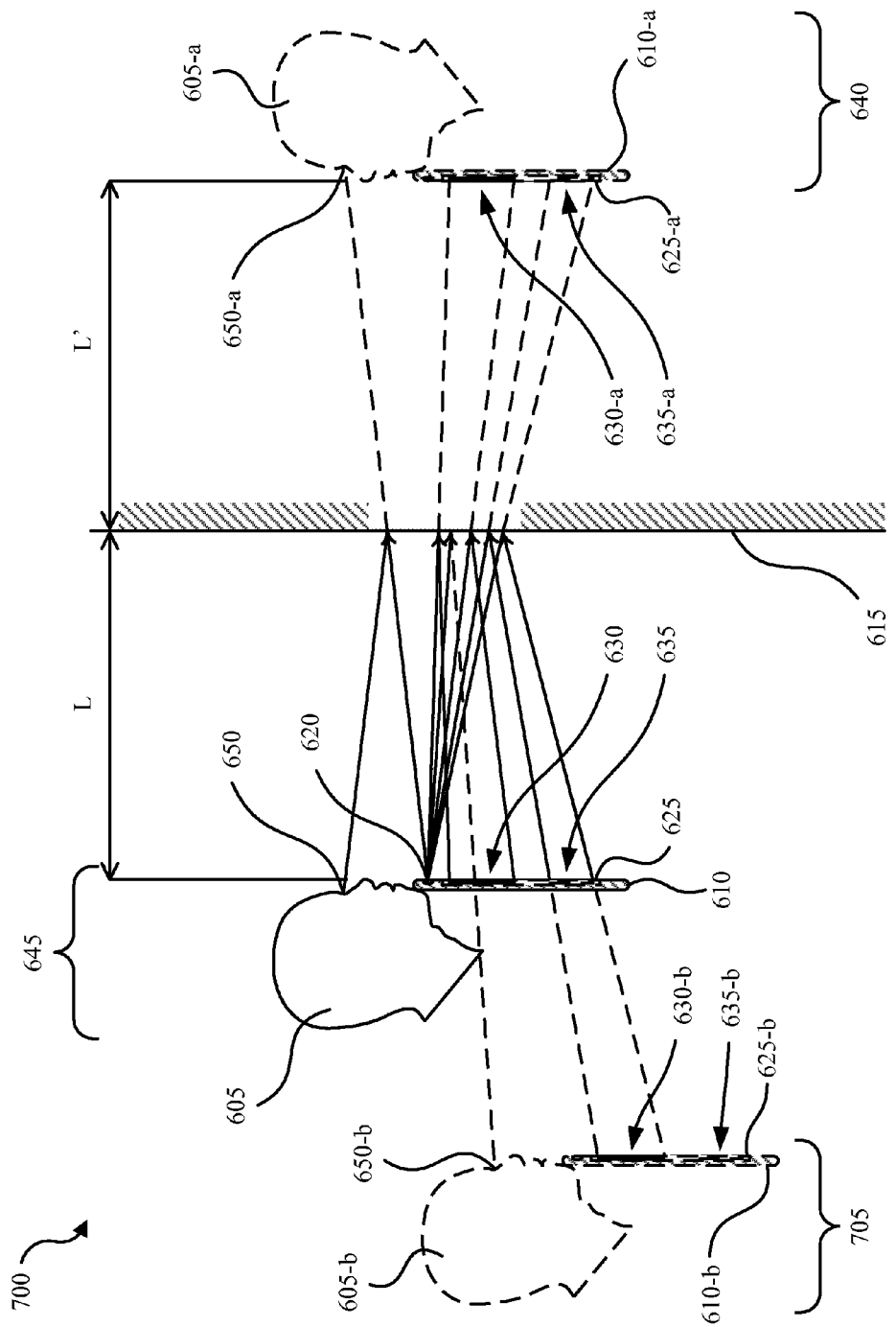
FIG. 7 is another diagram illustrating a right side view of how reflected images may be viewed by a camera of a mobile device.
Figure 8:
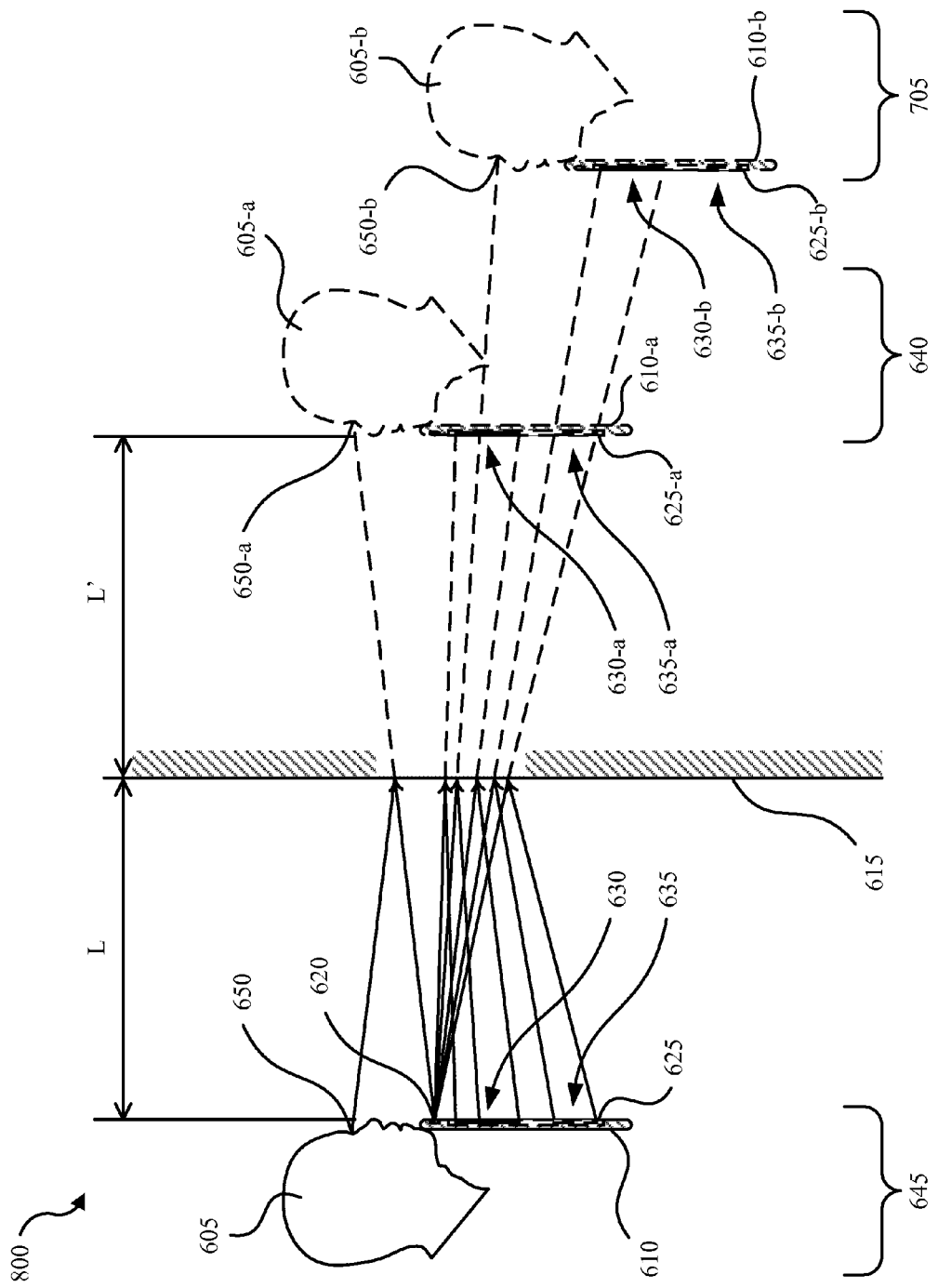
FIG. 8 is another diagram illustrating a right side view of how reflected images may be viewed by a camera of a mobile device.

FIGS. 7 and 8 expand FIG. 6 to show a diagram 700, 800 having the camera output 705 shown in relation to the original items 645 and the reflection 640. The camera output 705 represents what the camera 620 sees when the camera 620 is receiving a view of the reflection 640 while simultaneously displaying at least parts of the reflection 640 on the display 625. The reflection 640 includes a reflection of the display (e.g., 625-a), so an infinite-mirror-like effect may be created, similar to when an observer stands between two opposing mirrored surfaces. FIG. 8 is an alternate view of FIG. 7 emphasizing the view of the camera 620 over the output of the display 625 while depicting the alignment of corresponding images (e.g., compare the construction lines between images 630-b and 635 in FIG. 7 against construction lines between images 635-a and 630-b in FIG. 8).

The camera output 705 comprises a camera-output object 605-b with a camera-output target dimension 650-b and a camera-output device 610-b with a display 625-b and first and second calibration images 630-b, 635-b. The camera output 705 is shown lower than the original items 645 and reflection 640 because the output 705 is being shown on the display 625 of the device 610. The display 625 is lower than the camera 620, so the camera output 705 appears lower to the camera 620 than the reflection 640. If the camera 620 is repositioned with respect to the display 625 (e.g., translated elsewhere on the device 610 or tilted), the apparent location of the camera output 705 changes as well. In this view, the camera 620 is located and tilted with respect to the display 625 so that the camera-output first calibration image 630-b is aligned with the second calibration image 635 on the display 625, as explained in further detail below.

Construction lines run from the target dimension 650 to the camera 620 to show that target dimension 650 is viewable by the camera 620 in the positions shown. Corresponding dashed construction lines show how the camera 620 views the reflected target dimension 650-a and camera-output target dimension 650-b. These lines travel within the bounds of the edges of the displays 625, 625-a, 625-b, so the reflections 650-a, 650-b will be seen by the camera on the display 625. In FIG. 7, the camera-output target dimension 650-b is also seen traveling through the upper and lower bounds of the first calibration image 630, so it can be deduced that the first calibration image 630 will obscure the target dimension 650-b unless at some point the first calibration image 630 is removed or repositioned.

The camera 620 may simultaneously view the first calibration image 630, via the reflected first calibration image 630-a, and the camera-output first calibration image 635-b, via the display 625. Additional reproductions of the first calibration image 630 may be viewable if the camera 620 and device 610 are positioned properly to see reflections within the displayed reflections on the display 625. The camera 620 also views the camera-output target dimension 650-b via the display 625, which may be significant when measuring the camera-output target dimension 650-b, as described in more detail below.

Dashed construction lines running between the top and bottom of the second calibration image 635 and the camera-output first calibration image 630-b confirm that, as displayed on the display 625, the first calibration image 630-b is aligned with the second calibration image 635. In this embodiment, alignment means the top and bottom edges of the first calibration image 630-b align with the top and bottom edges of the second calibration image 635. With the images aligned in this manner, it can be concluded that the device 610 is positioned at a predetermined distance L from the mirrored surface 615. Otherwise, one of the top and bottom edges of the first calibration image 630-b would not meet the top and bottom edges of the second calibration image 635 as seen by the camera 620 (see also FIGS. 11-13 and their description below).

In some arrangements, the mirrored surface 615 does not provide a 1:1 reflection of the original items 645 or the display 625 does not provide a 1:1 reproduction of the view of the camera 620, so the size of the reflection 640 or camera output 705 would need to be scaled accordingly in the diagram 700. For example, the mirrored surface 615 may be a virtual mirror (showing an output of a camera on a display) that has uneven aspect ratios, pixel size ratios, and the like.

Figure 9:
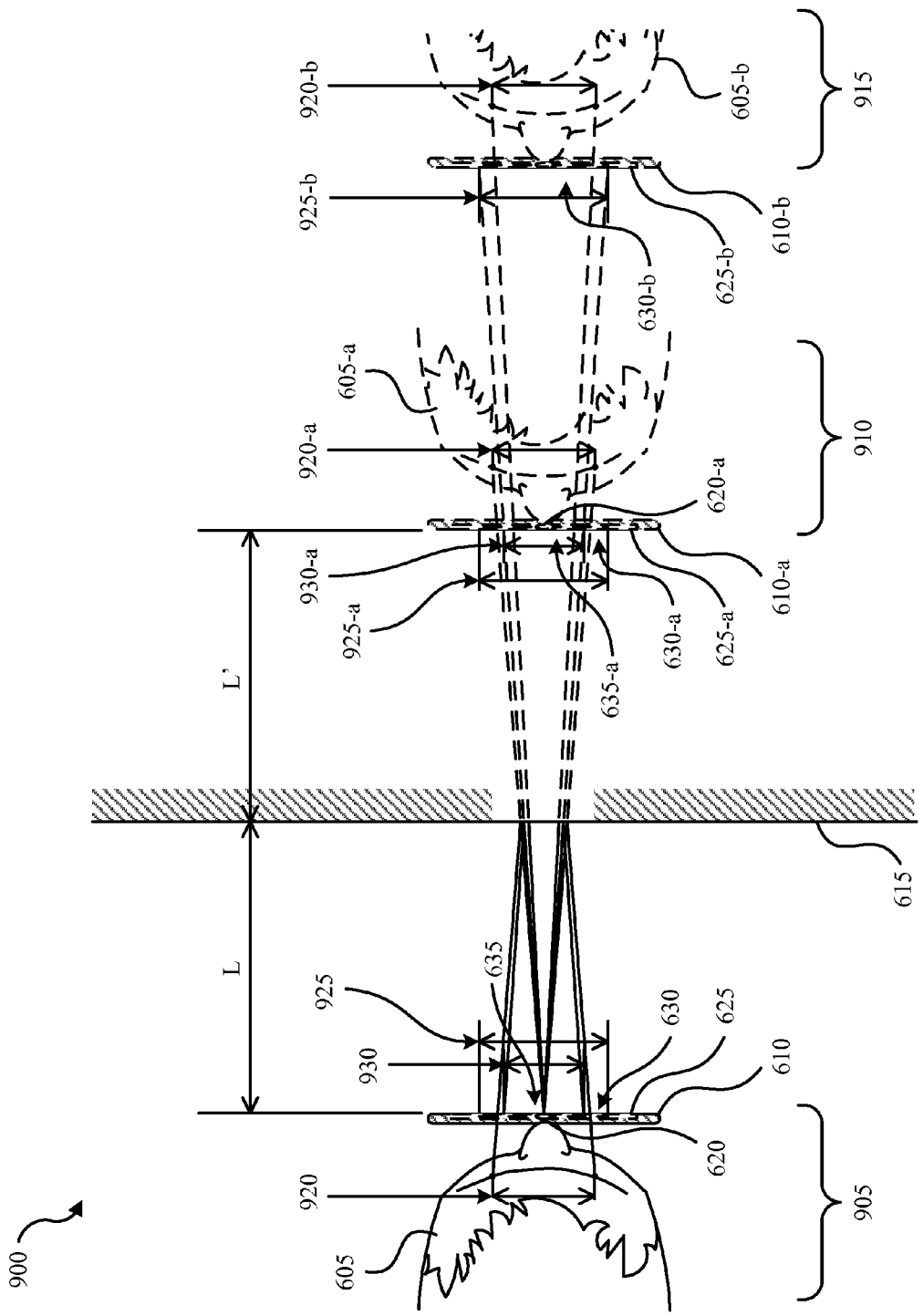
FIG. 9 is a diagram illustrating an overhead view of how reflected images may be viewed by a camera of a mobile device.

FIG. 9 is an overhead view diagram 900 of a scene comparable to FIG. 8. The original items 905 are reflected by the mirrored surface 615, as shown by the reflection 910 and the camera output 915.

The top of the object 605 (e.g., head) is shown having a target dimension 920 (e.g., pupillary distance). A target dimension 920 may include two endpoints (e.g., pupils), and a distance between the endpoints. In some arrangements the target dimension 920 may be a space between two points, or the distance from one side of the object to the other. The mobile device 610 having the camera 620 and display 625 presents the first calibration image 630 having a first calibration image width 925 between left and right edges of the first calibration image 630. The second calibration image 635 is also displayed having a second calibration image width 930 between left and right edges of the second calibration image 635. Corresponding elements are found in the reflection 910 (designated by numerals with the letter 'a' appended) and in the camera output 915 (designated by numerals with the letter 'b' appended).

Again, the object 605 is set in front of the mirrored surface 615 at a distance L, and the reflection 910 therefore appears to be at a distance L' "behind" the mirrored surface 615. Solid construction lines between the object 605 and mirrored surface 615 illustrate how light is reflected into the camera 620 from the original items 905, and dashed construction lines between the mirrored surface 615 and the reflection 910 and camera output 915 are for convenience in picturing the view of the reflection 910 and camera output 915 as seen by the camera 620.

Accordingly, when the camera 620 is positioned as shown in front of the mirrored surface 615, the width of the camera-output first calibration image 925-b aligns with the width of the reflection of the second calibration image 930-a as seen by the camera 620, giving to the camera 620 an appearance of completely overlapping widths of the two images 925-b, 930-a. Additionally, the camera 620 views the reflections of the target dimension 920-a, 920-b since, as shown by the construction lines, the ends of the target dimension can be seen within the bounds of the displays 625-a, 625-b.

The camera output 915 is shown along the same center-line (not shown) as the reflection 910 and original items 905 because the camera 620 is centrally positioned on the device 610 in reference to the display 625. If the camera 620 were angled or otherwise changed positions away from the center line (not shown), the camera output 915 may be moved in response.

Taken together, FIGS. 8 and 9 illustrate how the target dimension 920 is viewable by the camera 620 when the proper depictions of the first and second calibration images are properly aligned. FIG. 8 shows how vertical alignment operates, and FIG. 9 shows how horizontal alignment operates. For a given size and position of the first and second calibration images 630, 635 on the display 625, the distance L may be predetermined. If the device is moved too close or too far from the mirrored surface 615, horizontal or vertical alignment (or both) may not produce the desired results, since the width and height of the calibration images may either excessively overlap each other or may fit within one another. Conversely, for a given distance L, the relative size of the calibration images may be calculated as sizes that make alignment at distance L possible.

The distance L may be predetermined to be close enough to the mirrored surface 615 so that when the device 610 aligns the calibration images, the camera's 620 view of the target dimension 920 (or 920-a, 920-b) may be large enough to allow effective pattern recognition or more effective estimation of the size of the dimension by comparison to a reference dimension on the device 610. For example, in some embodiments, a portion (e.g., an edge length or a distance between two guide points) of the device 610 may be used as a reference dimension, so the size and shape of the calibration images (and distance L) may be predetermined to ensure that the camera 620 has a view of that portion of the device when the device 610 is aligned, e.g., in accordance with FIGS. 8 and 9. In another illustrative example, the distance L may be set to a size that allows capture of an image of the entire face while the device 610 is properly aligned. Having an image of the entire face may help many facial feature recognition software programs to operate effectively (e.g., helps detect the location of the pupils of the eyes in relation to the rest of the face). Thus, setting up an optimal distance L or scale of calibration images may help ensure that an image of the object 605 seen by the camera 620 has a useful size and resolution.

Figure 10:
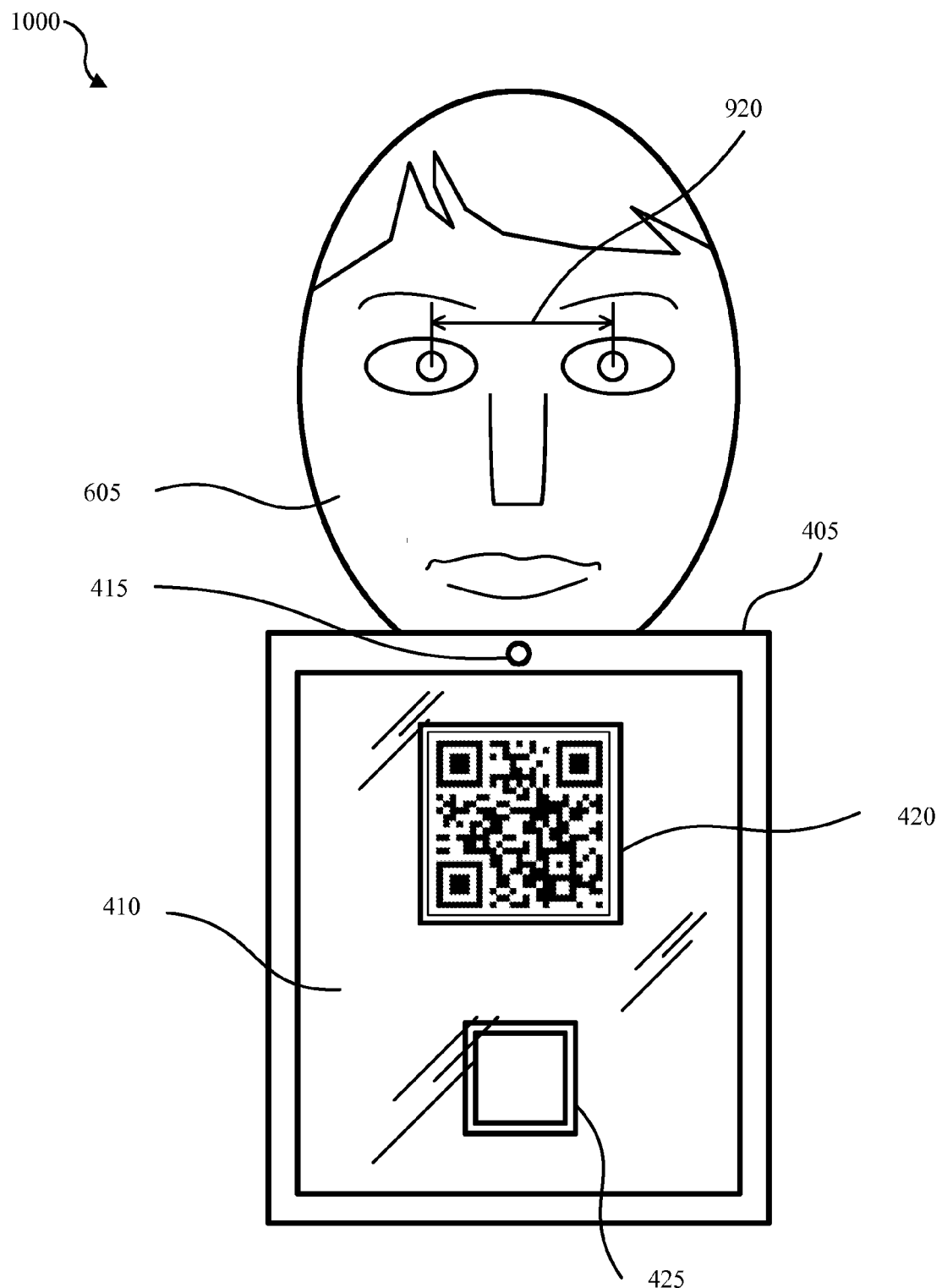
FIG. 10 illustrates an example of a mobile device shown with an object having a target dimension.

FIG. 10 shows a diagram 1000 of an object 605 (e.g., head) with a target dimension 920 (e.g., pupillary distance) shown with the mobile device 405 having a display 410, camera 415, and showing a first and second calibration image 420, 425 on the display 410. The output of the camera 415 is not being shown on the display 410, but FIGS. 11-13 illustrate how the display 410 may appear when the output of the camera 415 is being shown.

Figure 11:
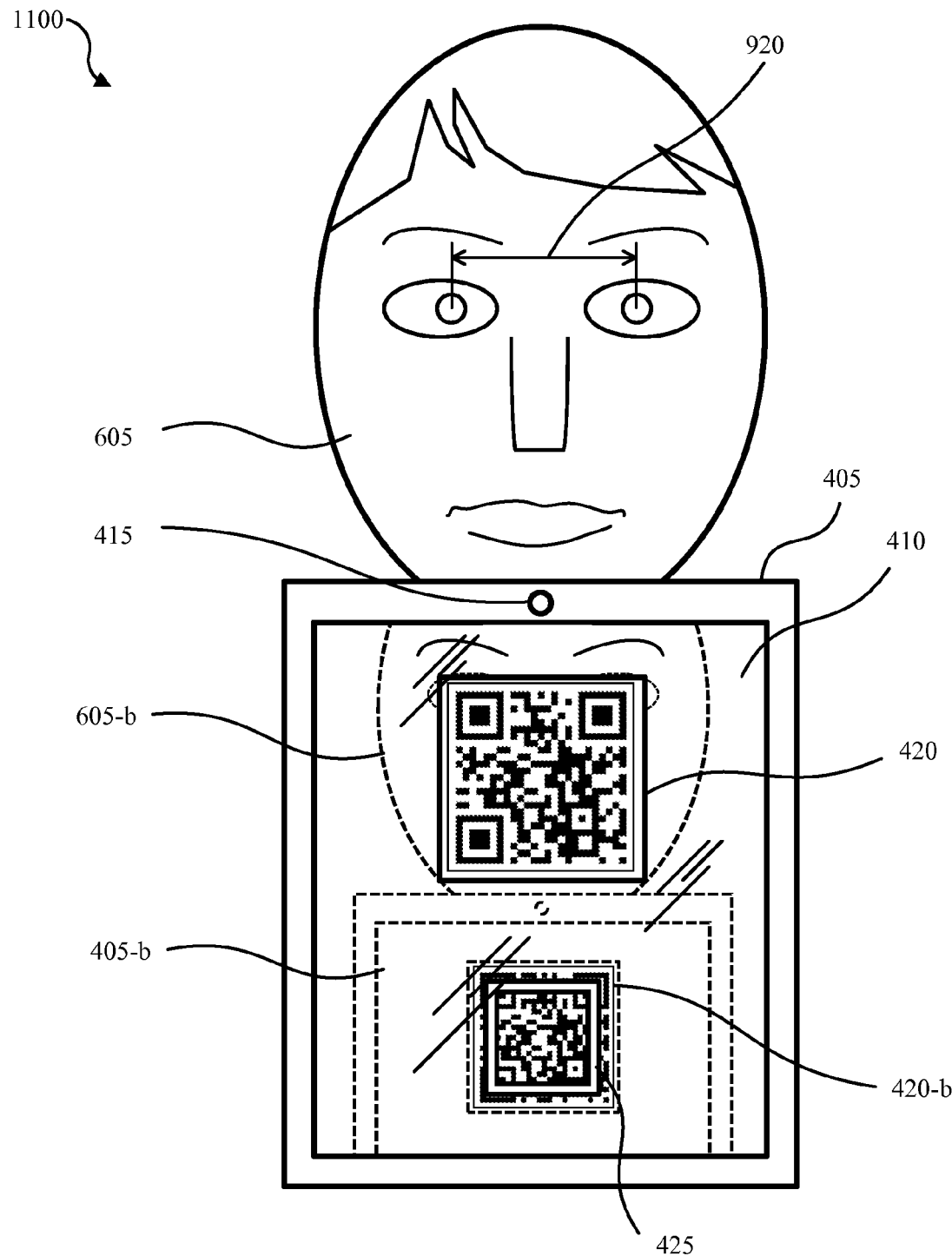
FIG. 11 illustrates an example of a mobile device showing the output of its camera where the calibration images are not aligned.

In FIG. 11, the camera output of the first calibration image 420-b is not aligned with the second calibration image 425 on the display 410. The camera-output first calibration image 420-b is too large to fit within the second calibration image 425. In some embodiments, this means the device 410 may be too close to the mirrored surface 615. Thus, in some embodiments, the misalignment produces a displayed object 605-b that may be too large to be measured or incapable of having pattern recognition software find features on the object.

Figure 12:
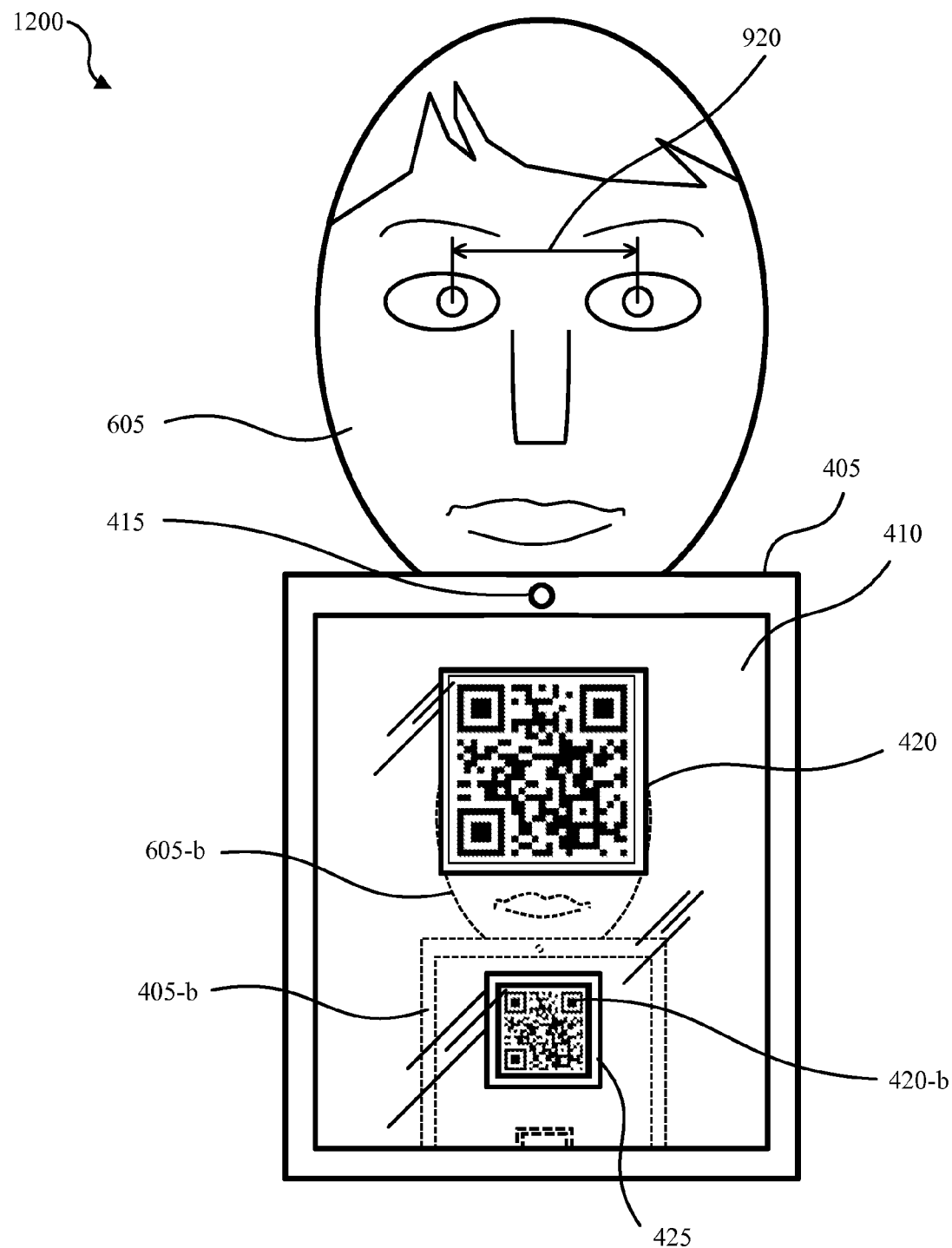
FIG. 12 illustrates an example of a mobile device showing the output of its camera where the calibration images are aligned.

In FIG. 12, the camera output of the first calibration image 420-b is aligned with the second calibration image 425 on the display 410. The edges of the camera-output first calibration image 420-b align with the edges of the second calibration image 425. In order for this to occur, the device 410 must be positioned at a predetermined distance L that may be set by the orientation, shape, and size of the first and second calibration images 420, 425. In some configurations, this also means that the camera-output of the object 605-b may be properly sized and oriented to allow pattern recognition and measurement of the target dimension 920.

Figure 13:
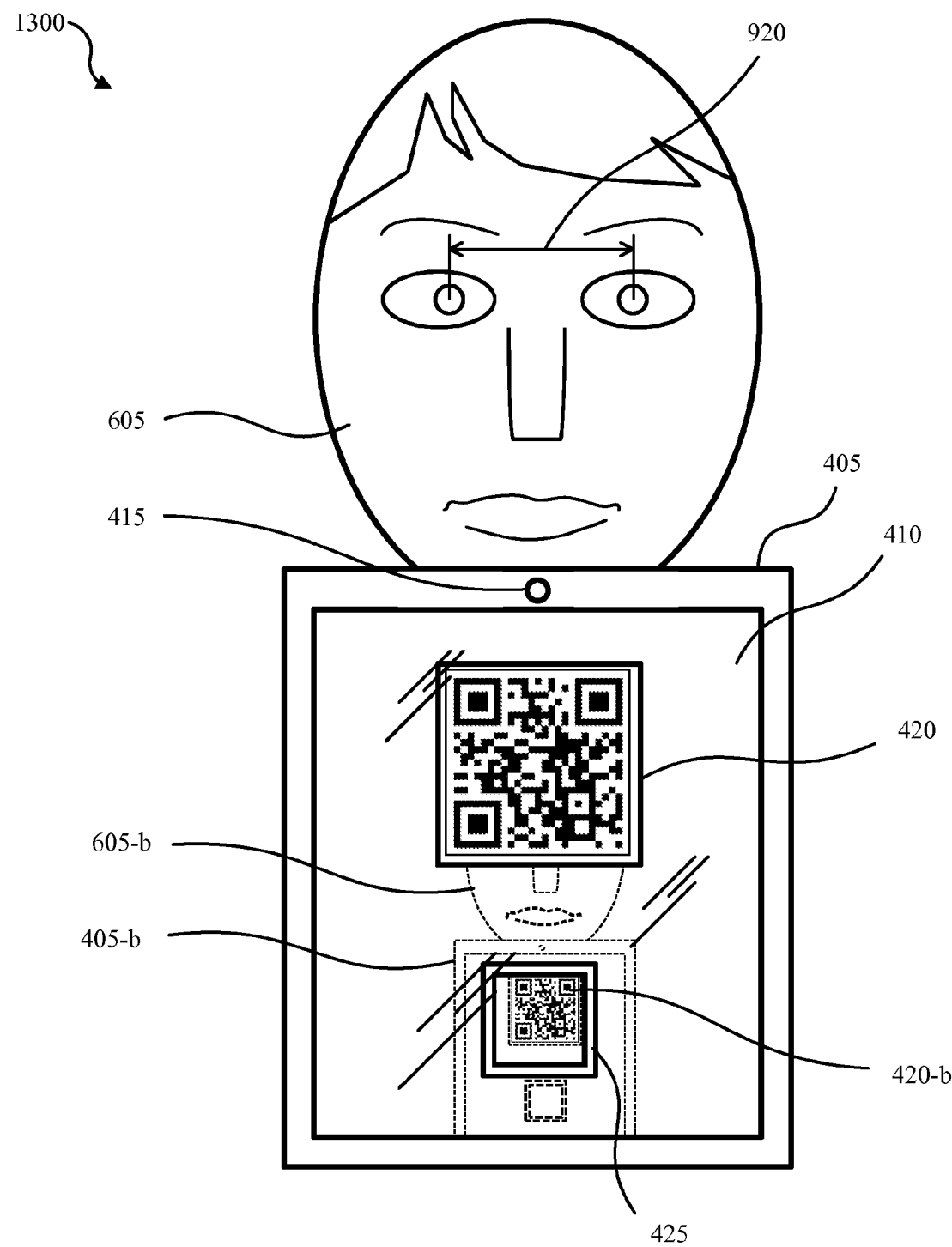
FIG. 13 illustrates an example of a mobile device showing the output of its camera where the calibration images are not aligned.

In FIG. 13, the camera output of the first calibration image 420-b is not aligned with the second calibration image 425 on the display 410. The camera-output first calibration image 420-b may be too small to fit the second calibration image 425. In some embodiments, this means the device 410 may be too far from the mirrored surface 615. Thus, in some embodiments, the misalignment produces a displayed object 605-b that may be too small to be measured or non-optimal for having pattern recognition software find features on the object.

According to some arrangements, a method may be provided of positioning a mobile device in relation to a mirrored surface wherein the device may be moved between viewpoints where the camera-output first calibration image 420-b is too large (e.g., FIG. 11) or too small (e.g., FIG. 13) to align with the second calibration image 425 as needed until alignment may be reached (e.g., FIG. 12). In some embodiments, the mobile device may be positioned adjacent to a portion of the object. In some cases, the mobile device may be positioned adjacent to a facial feature. In the case where the target dimension is a pupillary distance, the mobile device may be positioned at the chin of the face being measured. If positioned at a chin portion of the face, the remaining facial features (e.g., lips, nose, eyes, and/or ears) may be concurrently viewed by the camera and therefore may be served to a pattern recognition engine capable of detecting the appropriate features for measurement in relation to the other features on the face.

Once a mobile device is properly positioned at a mirrored surface (e.g., as shown in FIGS. 7-9, and 12), an image may be captured by the camera of the mobile device. This image may be referred to as a reference image. A reference image may contain a view of a reference dimension (e.g., the width of the first calibration image or the distance between the second calibration image and the camera) and the target dimension.

Figure 14:
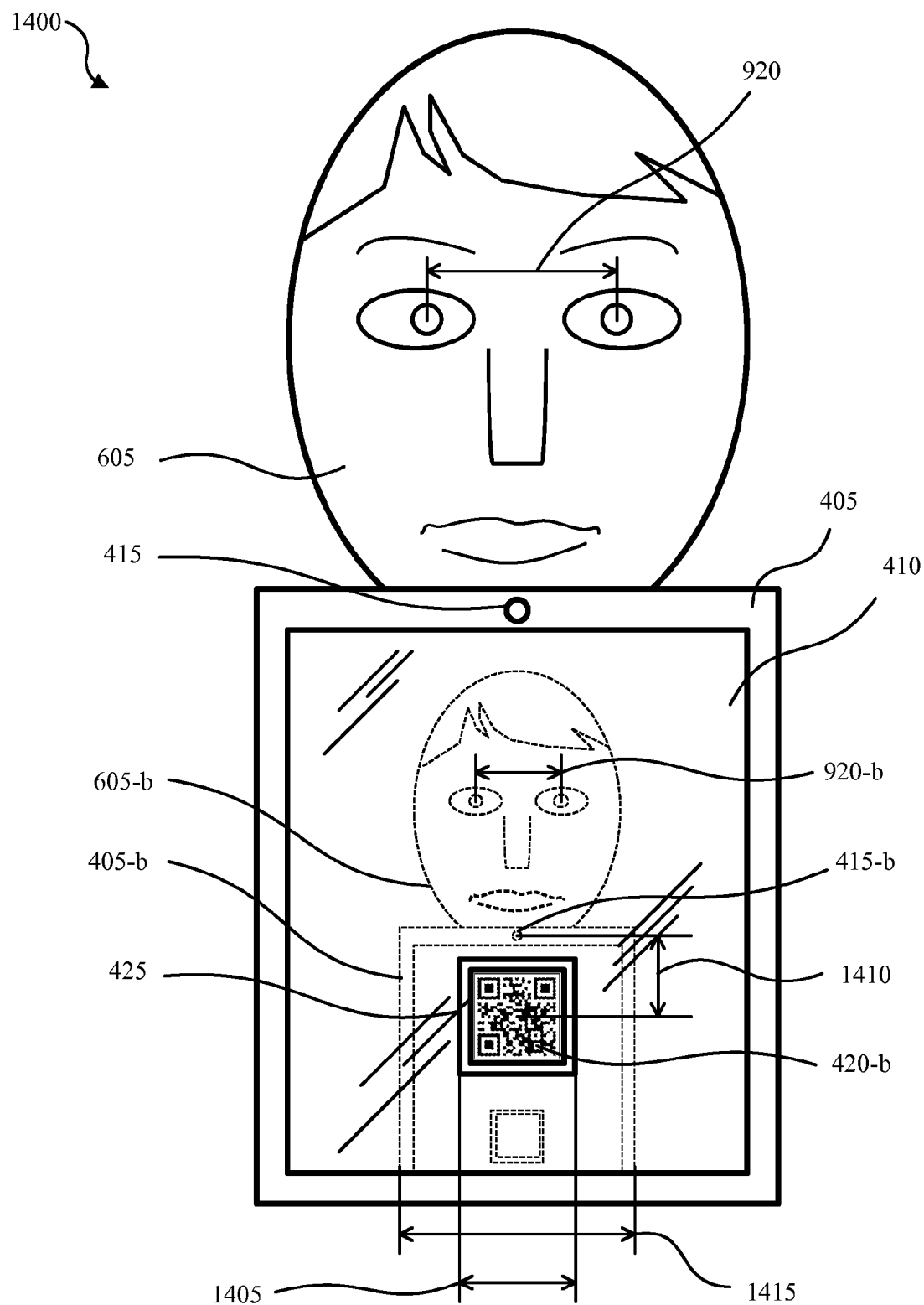
FIG. 14 illustrates an example of a mobile device showing the output of its camera where the calibration images are aligned and a calibration image is removed.

FIG. 14 is a diagram 1400 showing a scene where the mobile device 405 may be prepared to determine the target dimension 920. In some embodiments, the mobile device 405 creates a reference image from the view of the display 410 at this position. In this embodiment, the first calibration image is not displayed at this time so that the camera 415 can more fully see the camera-output object 605-b. The camera 415 may still capture a reference image while the first calibration image is being shown, such as, for example, by saving a reference image with the camera 415 without displaying the first calibration image at the same time. A reference image may also be obtained by capturing camera output of the camera-output target dimension 920-b when it is not obscured by the first calibration image.

The target dimension 920 may be calculated at this point by comparing the camera-output target dimension 920-b to a reference dimension shown in the display 410. For instance, the camera-output target dimension 920-b may be compared to a dimension of the second calibration image 425 (e.g., image width 1405). In other examples, the reference dimension may be a dimension of the camera-output device 405-b (e.g., device width 1415) or may be a relative dimension of the camera-output device 405-b and an image displayed on the camera-output device 405-b (e.g., distance from the camera-output camera 415-b to the center of the camera-output first calibration image 420-b, shown as distance 1410).

In an alternative embodiment, the target dimension 920 may be calculated from a reference image because the reference dimension may be the size of the image itself when gathered from the camera. When the device 405 is properly positioned for alignment of the first and second calibration images, the distance between the device 405 and the mirrored surface (e.g., 615) may be known. When the object 605 (or at least the target dimension 920) is also at that known distance and the target dimension 920 can be detected in the image, a scale for the image can be deduced. For example, at a known distance from a mirror, it may be deduced that the bounds of an image of the reflection of the object captured by a camera at that distance extends a certain number of inches in width and height for objects in-plane with the camera and display (or for a known distance in front of or behind the display). Thus, the distance between two points on the object may be calculated by comparing the length of the line segment connecting those points to a dimension of the image (e.g., width). In a related embodiment, a grid may be overlaid on the reference image that may be scaled to the known width or height of the reference image, such as a grid showing lines at every inch in the reference image. The target dimension may then be measured against the grid lines.

The reference dimension may be used to measure the camera-output target dimension 920-b. For example, a spatial relationship may exist between the two dimensions. In some embodiments, the lengths of the two dimensions may be directly compared in the reference image or on the display 410 of the mobile device 405. For instance, if the width of the second calibration image 1405 is a known length, its on-screen size may be directly compared to the on-screen size of the target dimension 920-b and the width of the second calibration image 1405 may be proportionally scaled upward or downward to produce a measurement for the target dimension 920.

After measuring the target dimension 920, a 3-D model of the object may be scaled to match the measurement. For example, when the object is a head and the target dimension is a pupillary distance, a 3-D model of the head may be scaled so that the pupils of the model are a given distance apart. The rest of the 3-D model may also correspondingly scale, shrinking or enlarging along with the pupillary distance on the 3-D model in accordance with the measured dimension.

Figure 15:
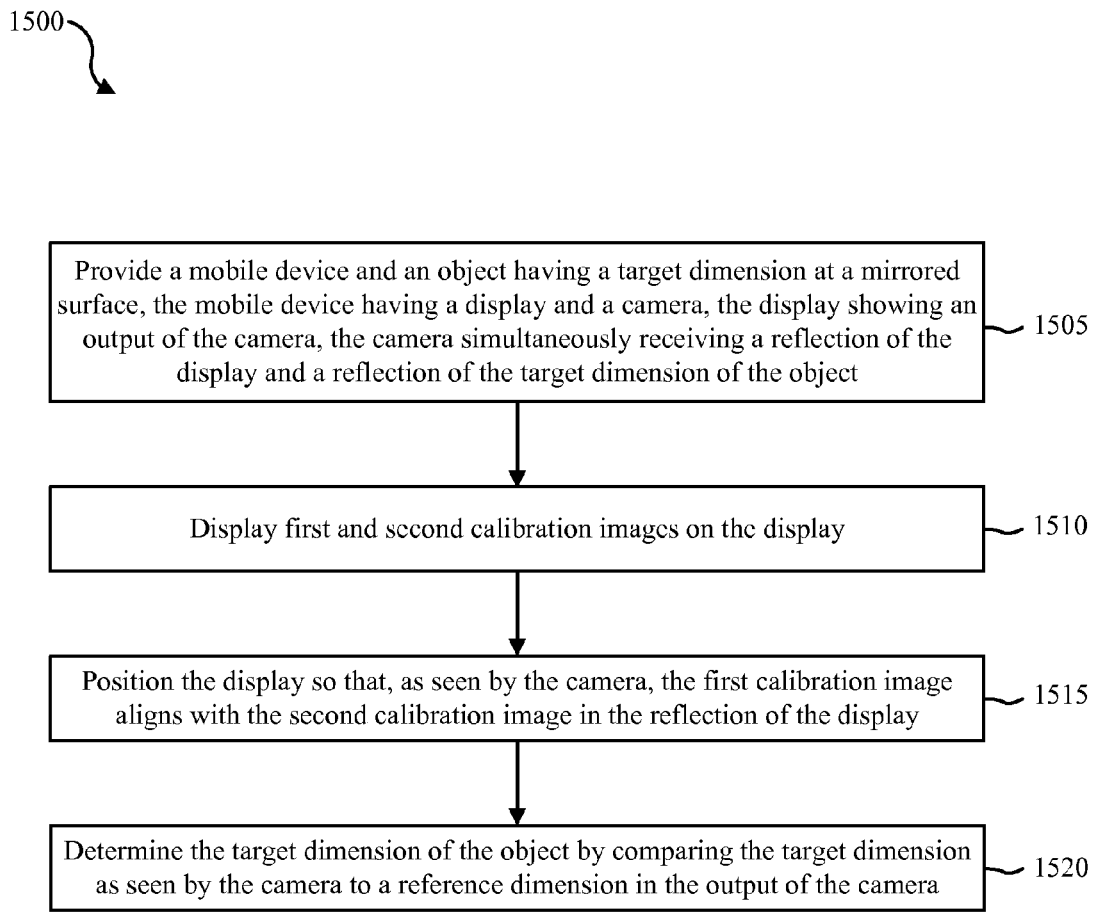
FIG. 15 is a flow diagram illustrating one embodiment of a method for scaling a 3-D model of an object.

FIG. 15 is a flow diagram illustrating an example method 1500 to scale a 3-D model using a reflection of a mobile device. In some configurations, the method 1500 may be implemented by the scaling module 115 illustrated in FIGS. 1, 2, and/or 3.

At block 1505, a mobile device and an object having a target dimension may be provided at a mirrored surface. The mobile device may have a camera and a display wherein the display may show an output of the camera. At the mirrored surface, the camera may simultaneously receive a reflection of the display and a reflection of the target dimension of the object. At block 1510, the display may display first and second calibration images.

At block 1515, the display may be positioned so that, as seen by the camera, the first calibration image aligns with the second calibration image in the reflection of the display. At block 1520, the target dimension of the object may be determined by comparing the target dimension as seen by the camera to a reference dimension in the output of the camera.

Figure 16:
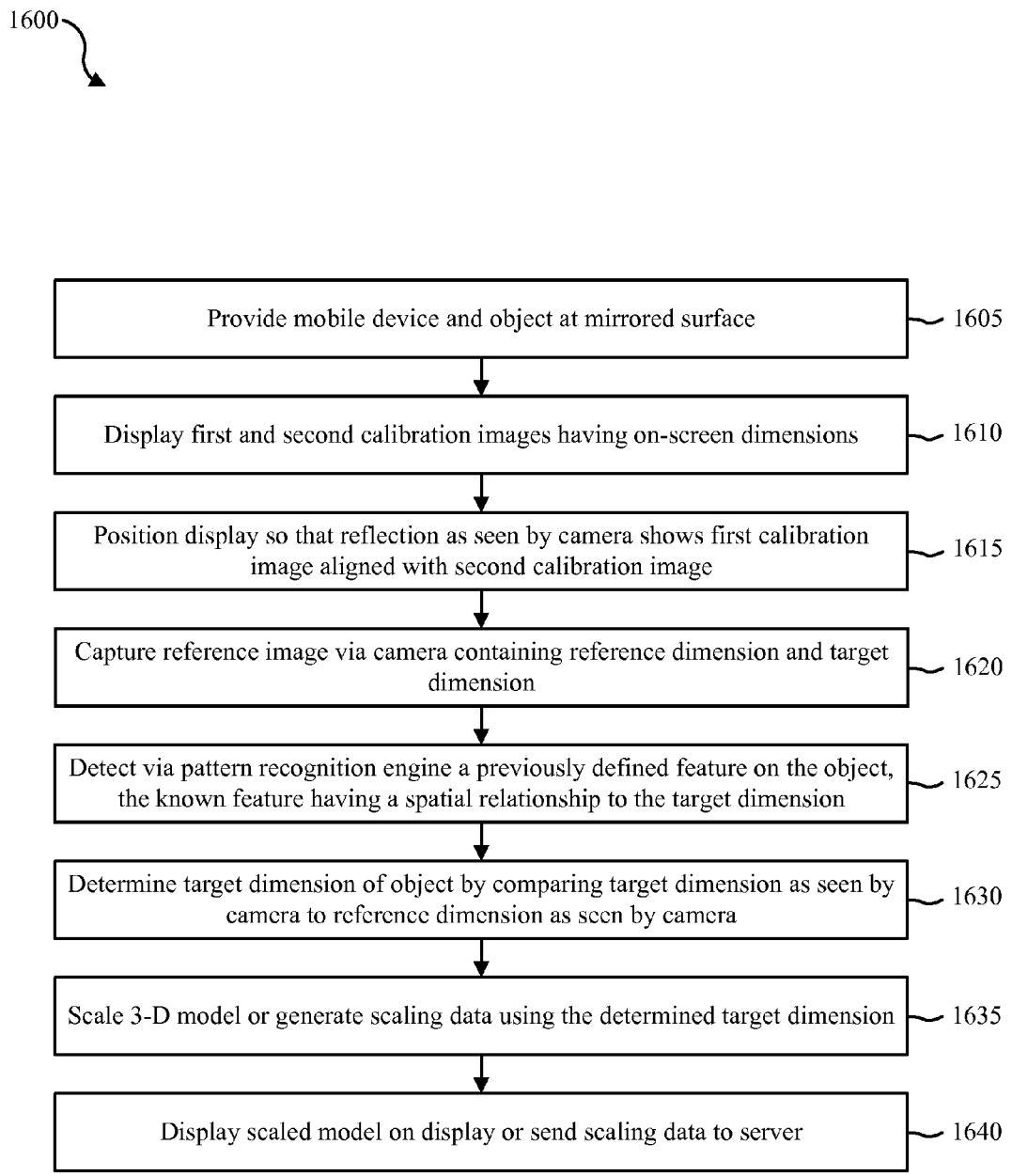
FIG. 16 is a flow diagram illustrating another embodiment of a method for scaling a 3-D model of an object.

FIG. 16 is a flow diagram illustrating one example of a method 1600 to scale a 3-D model using a reflection of a mobile device. In some configurations, the method 1600 may be implemented by using the scaling module 115 illustrated in FIGS. 1, 2, and/or 3.

At block 1605, a mobile device and object may be provided at a mirrored surface. The mobile device may comprise a camera and a display, where the display shows an output of the camera. The camera may simultaneously receive a reflection of the display and a reflection of a target dimension of the object. In some arrangements, the camera and display may be integrally connected, and both the camera and the display face the mirrored surface while the output of the camera is shown on the display.

At block 1610, the mobile device displays first and second calibration images. The first and second calibration images may have a predetermined size. For example, the first and second calibration images may have a predetermined widths and heights. The calibration images may be shown at a position on the display where the distance is predetermined between a reference point on the device (e.g., a camera) and the calibration image. In some cases, one or more calibration images may cover up a portion of the object on the display. In one example, one calibration image is a machine-readable identification code such as a QR code, and the other calibration image is a square block or bracket having the aspect ratio of the QR code (e.g., a square).

At block 1615, the mobile device may be positioned so that the reflection as seen by the camera shows the first calibration image aligned with the second calibration image. For example, the reflection of the first calibration image as displayed may overlap with the second calibration image on the display or vice versa. In another example, the calibration images may have interlocking patterns that form a shape when the device is properly positioned. Alignment may be determined by whether the calibration images have a proper scale relationship between each other. In one case, alignment may depend on matching the scale of the depiction of the first calibration image as seen by the camera with the scale of the second calibration image on the display. In another embodiment, the calibration images may change appearance when they are aligned. For example, the calibration images may change color when they are aligned in order to give feedback to the user regarding the alignment status detected by the camera.

At block 1620, the camera captures a reference image containing a reference dimension and a target dimension of the object. The target dimension may be defined by the distance between two points on the object as seen in the reference image or as seen on the display of the mobile device. In some cases, the target dimension may be the distance between two shapes on the device, such as, for example, two pupils on a face, in the case of a pupillary distance, or the tips of the ears on a head. The reference dimension may be defined by a known distance between two points on the device, such as, for example, the distance between two outer edges of the device, the distance between the camera of the device and a calibration image or other image shown on the display, or the width of a calibration image or other scaling image shown on the display. The reference image may be captured and stored for processing by the mobile device. In some instances, the reference image may be sent to a server or other computer connected to the mobile device via a network for processing measurements and patterns. A reference image may not be captured in all instances, as the target dimension may be directly determined on the display without use of a stored reference image if the mobile device has the necessary power and software to do so.

At block 1625, a pattern recognition engine may be implemented to detect a previously-defined feature on the object. The pattern recognition engine may be pattern recognition software. In some arrangements the pattern recognition engine may be a logic engine or a human-assisted recognition program. A pattern recognition engine may implement a computer vision algorithm including a method for acquiring, processing, analyzing, and understanding images. Pattern recognition may include detection of shapes or features in a still image or moving picture of an object. For example, the pattern recognition engine may detect the type of object in an image, such as a face or a corner, or detect an environment around an object (e.g., detecting the sky or detecting the horizon). In some embodiments, the pattern recognition engine may detect symbols such as handwriting or typed letters. In some embodiments, significant shapes may be detected, such as, for example, squares or stars. A previously-defined feature on the object may be a feature recognized by the pattern recognition engine. For example, the pattern recognition engine may detect the location of eyes on a face or any of the other shapes and features previously mentioned.

The previously-defined feature may have a spatial relationship to the target dimension. The spatial relationship may establish that the previously-defined feature is part of the target dimension, such as one or more previously-defined features comprising endpoints of the target dimension. In one example, the previously-defined features are the pupils of two eyes detected by the pattern recognition engine, and the eyes have a spatial relationship to the target dimension by serving as the endpoints to a line segment that defines the target dimension.

At block 1630, a target dimension of the object may be determined by comparing the target dimension as seen by the camera (i.e., the camera-output target dimension) to a reference dimension as seen by the camera. The reference dimension may be a predetermined distance between two points in the output of the camera or in a reference image, as described in detail in relation to the above-described configurations. In some embodiments, the lengths of the two dimensions may be directly compared in the reference image or on the display of the mobile device. For instance, if a width of the second calibration image is a known length, its on-screen size may be directly compared to the on-screen size of the target dimension and the width of the second calibration image may be proportionally scaled upward or downward to produce a measurement for the target dimension. In some embodiments, determining the target dimension includes obtaining a ratio representing the comparative length of the target dimension against the reference dimension, then applying that ratio to the known length of the reference dimension to produce the target dimension.

At block 1635, a 3-D model may be scaled using the determined target dimension. For example, when the object is a head and the target dimension is a pupillary distance, a 3-D model of the head may be scaled so that the pupils of the model are a given distance apart. The rest of the 3-D model may also correspondingly scale by shrinking or enlarging along with the pupillary distance on the 3-D model in accordance with the measured dimension. In some arrangements, the determined target dimension may be used to generate scaling data. The scaling data may comprise measurement values or other information needed to scale a 3-D model. It may be advantageous to generate scaling data instead of scaling the 3-D model directly. For example, if block 1635 is performed on a mobile device, the device may not be capable of scaling the 3-D model due to hardware limitations (e.g., limited graphics processing capabilities), so by generating scaling data, the mobile device may transfer that function to another machine.

In one example, a scaled 3-D model of the user may be used to render images that may be displayed (to the user, for example) on the display. For instance, the scaled 3-D model of the user and a scaled 3-D model of a product (e.g., a scaled pair of glasses, scaled based on the same scaling standard, for example, based on the user's pupillary distance) may be used to render images for a properly scaled virtual try-on. In one example, a properly scaled virtual try-on may facilitate a realistic virtual try-on shopping experience. For instance, a properly scaled user try-on may allow a pair of glasses to be scaled properly with respect to the user's face/head. In some cases, this may enable a user to shop for glasses and to see how the user looks in the glasses (via the properly scaled virtual try-on) simultaneously.

At block 1640, the scaled 3-D model may be displayed. The model may be displayed on the display of the mobile device or on another display. In some embodiments, at block 1640, the scaling data may be sent to a server (or other computer or mobile device), such as, for example, sent over a network (see FIG. 2 and its attendant description). This may be advantageous when the server or other computer has more powerful processing ability than the mobile device.

In some embodiments, the method 1600 may be embodied in a software program or application executable by one or more processors. For example, the software program or application may be executed on a computing device having a processor and electronically associated memory, and the processor executes the blocks of the method 1600. In some arrangements, this means that certain functions may be performed by instructing a user. For example, the user may be provided instructions to position the mobile device according to blocks 1605 or 1615. In some embodiments, the user may be required to capture the reference image (as in block 1620). This may entail instructing a user to capture the reference image or instructing the user how to capture a reference image.

In some embodiments, a user may position the display according to block 1615. The user may be prompted by the application to hold the device in the recommended position while the application performs other functions. For example, while the user is holding the device still, the application may capture a reference image or change the appearance of the calibration images. In one case, the application may require the user to hold the device in a position, and one of the calibration images may be removed from the display, providing more space on the display for other images (e.g., the camera output). This may be advantageous since the device may be more accurately positioned when using large calibration images, but they may be removed once the device is properly positioned and the calibration images are no longer needed for positioning the device. However, in some embodiments at least one calibration image is not removed to allow it to serve as a reference dimension, thereby facilitating the determination of the target dimension. In another example embodiment, after the user is directed to position the display to align the calibration images, the position must be maintained for a limited time before a reference image is captured or the target dimension is determined. If the calibration images leave a state of alignment as seen by the camera, the user may be instructed to try again. This may be beneficial in ensuring that the camera has time to focus and to ensure that the user is ready for the image to be captured.

Figure 17:
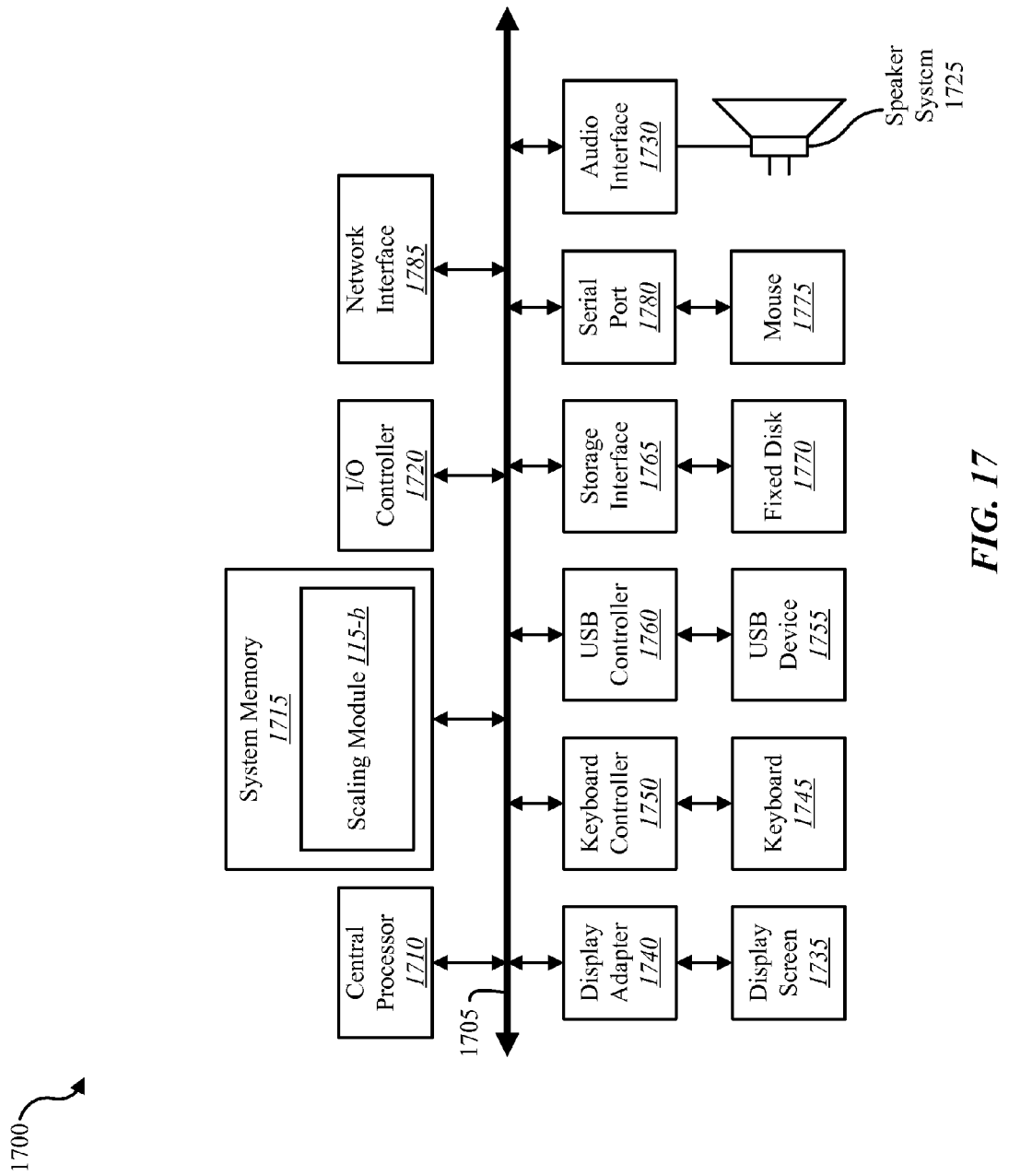
FIG. 17 depicts a block diagram of a computer system suitable for implementing the present systems and methods.

FIG. 17 depicts a block diagram of a computer system 1700 suitable for implementing the present systems and methods. For example, the computer system 1700 may be suitable for implementing the device 105, 405, 610 illustrated in various figures (e.g., FIGS. 1, 2, 4, 5, 6, 7, and 10) and/or the server 210 illustrated in FIG. 2. Computer system 1700 includes a bus 1705 which interconnects major subsystems of computer system 1700, such as a central processor 1710, a system memory 1715 (typically RAM, but which may also include ROM, flash RAM, or the like), an input/output controller 1720, an external audio device, such as a speaker system 1725 via an audio output interface 1730, an external device, such as a display screen 1735 via display adapter 1740, a keyboard 1745 (interfaced with a keyboard controller 1750) (or other input device), multiple universal serial bus (USB) devices 1755 (interfaced with a USB controller 1760), and a storage interface 1765. Also included are a mouse 1775 (or other point-and-click device) interfaced through a serial port 1780 and a network interface 1785 (coupled directly to bus 1705).

Bus 1705 allows data communication between central processor 1710 and system memory 1715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the scaling module 115-*b* to implement the present systems and methods may be stored within the system memory 1715. The scaling module 115-*b* may be one example of the scaling module depicted in FIGS. 1, 2, 3, and/or 17. Applications (e.g., application 215) resident with computer system 1700 are generally stored on and accessed via a non-transitory computer readable medium, such as a hard disk drive (e.g., fixed disk 1770) or other storage medium. Additionally, applications can be in the form of electronic signals modulated in accordance with the application and data communication technology when accessed via interface 1785.

Storage interface 1765, as with the other storage interfaces of computer system 1700, can connect to a standard computer readable medium for storage and/or retrieval of information, such as a fixed disk drive 1770. Fixed disk drive 1770 may be a part of computer system 1700 or may be separate and accessed through other interface systems. Network interface 1785 may provide a direct connection to a remote server via a direct network link to the Internet via a POP (point of presence). Network interface 1785 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 17 need not be present to practice the present systems and methods. The devices and subsystems can be interconnected in different ways from that shown in FIG. 17. The operation of a computer system such as that shown in FIG. 17 is readily known in the art and is not discussed in detail in this application. Code to implement the present disclosure can be stored in a non-transitory computer-readable medium such as one or more of system memory 1715 or fixed disk 1770. The operating system provided on computer system 1700 may be iOS®, MS-DOS®, MS-WINDOWS®, OS/2®, UNIX®, Linux®, MAC OS X®, or another like operating system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for determining a target dimension of an object, the method comprising:
    displaying at least a first calibration image and a second calibration image on a display of a mobile device;
    capturing, via a camera on the mobile device, a reflection of an object, a reflection of the first calibration image, and a reflection of the second calibration image, the reflections being produced by a mirrored surface;
    displaying the captured reflections of the object, the first calibration image, and the second calibration image on the display of the mobile device;
    capturing, via the camera of the mobile device, a reflection of the displayed captured reflections produced by the mirrored surface; and
    detecting when the captured reflection of the displayed captured reflection of the first calibration image is positioned relative to the captured reflection of the second calibration image.

2. The method of claim 1, further comprising:
    scaling an image of the object based at least in part on the detection of the relative positioning of the captured reflections of the first and second calibration images.

3. The method of claim 2, further comprising:
    generating a three dimensional model of the object; and
    scaling the three dimensional model of the object based on the scaling of the image of the object.

4. The method of claim 1, further comprising:
    capturing an image of the object in relation to the detection of the relative positioning of the captured reflections of the first and second calibration images.

5. The method of claim 4, further comprising:
    determining a target dimension of the object from the captured image of the object.

6. The method of claim 5, wherein the target dimension is a distance between two points on the object.

7. The method of claim 6, wherein the object is a human face and the display is positioned relative to the human face.

8. The method of claim 6, further comprising:
    detecting at least one facial feature of the object, the facial feature spatially related to the target dimension.

9. The method of claim 4, further comprising:
    relating a detected aspect of the image to a predetermined reference dimension in relation to the detection of the relative positioning of the captured reflections of the first and second calibration images.

10. The method of claim 1, wherein the first calibration image is a machine-readable identification code.

11. A computing device configured to determine a target dimension of an object, comprising:
    a processor;
    memory in electronic communication with the processor;
    instructions stored in the memory, the instructions being executable by the processor to:
        display at least a first calibration image and a second calibration image on a display of a mobile device;
        capture a reflection of an object, a reflection of the first calibration image, and a reflection of the second calibration image, the reflections being produced by a mirrored surface;
        display the captured reflections of the object, the first calibration image, and the second calibration image on the display of the mobile device;
        capture a reflection of the displayed captured reflections produced by the mirrored surface; and
        detect when the captured reflection of the displayed captured reflection of the first calibration image is positioned relative to the captured reflection of the second calibration image.

12. The computing device of claim 11, wherein the instructions are executable by the processor to:
    scale an image of the object based on the detection of the relative positioning of the captured reflections of the first and second calibration images.

13. The computing device of claim 12, wherein the instructions are executable by the processor to:
    generate a three dimensional model of the object; and
    scale the three dimensional model of the object based on the scaling of the image of the object.

14. The computing device of claim 11, wherein the instructions are executable by the processor to:
    capture an image of the object in relation to the detection of the relative positioning of the captured reflections of the first and second calibration images.

15. The computing device of claim 14, wherein the instructions are executable by the processor to:
    determine a target dimension of the object from the captured image of the object.

16. The computing device of claim 15 wherein the target dimension is a distance between two points on the object, and wherein the object is a human face and the display is positioned relative to the human face.

17. The computing device of claim 14, wherein the instructions are executable by the processor to:
    detect at least one facial feature of the face, the facial feature spatially related to the target dimension.

18. The computing device of claim 14, wherein the instructions are executable by the processor to:
    relate a detected aspect of the image to a predetermined reference dimension in relation to the detection of the relative positioning of the captured reflections of the first and second calibration images.

19. A computer-program product for determining, by a processor, a target dimension of an object, the computer-program product comprising a non-transitory computer-readable medium storing instructions thereon, the instructions being executable by the processor to:
    display at least a first calibration image and a second calibration image on a display of a mobile device;
    capture, via a camera on the mobile device, a reflection of an object, a reflection of the first calibration image, and a reflection of the second calibration image, the reflections being produced by a mirrored surface;

display the captured reflections of the object, the first calibration image, and the second calibration image on the display of the mobile device;

capture, via the camera of the mobile device, a reflection of the displayed captured reflections produced by the mirrored surface; and detect when the captured reflection of the displayed captured reflection of the first calibration image is positioned relative to the captured reflection of the second calibration image.

20. The computer-program product of claim 19, wherein the instructions are executable by the processor to:

scale an image of the object based on the detection of the relative positioning of the captured reflections of the first and second calibration images.

* * * * *